(12) United States Patent
Takahashi et al.

(10) Patent No.: US 7,582,010 B2
(45) Date of Patent: Sep. 1, 2009

(54) GAME MACHINE, GAME PROGRAM, AND INFORMATION STORAGE MEDIUM

(75) Inventors: Hiroyuki Takahashi, Shinjuku-ku (JP); Shugo Takahashi, Shinjuku-ku (JP); Yasuhiro Taguchi, Shinjuku-ku (JP); Toshiharu Izuno, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 828 days.

(21) Appl. No.: 10/656,272

(22) Filed: Sep. 8, 2003

(65) Prior Publication Data

US 2004/0176165 A1 Sep. 9, 2004

(30) Foreign Application Priority Data

Mar. 7, 2003 (JP) ............................. 2003-062389

(51) Int. Cl.
*A63F 13/06* (2006.01)
(52) U.S. Cl. .................... 463/3; 463/1; 463/7; 463/31
(58) Field of Classification Search ................ 463/36, 463/1–6, 33, 30, 37–39
See application file for complete search history.

(56) References Cited

U.S. PATENT DOCUMENTS

| 6,280,323 B1 | 8/2001 | Yamazaki et al. |
| 6,592,455 B1 | 7/2003 | Okano et al. |
| 6,626,756 B2 * | 9/2003 | Sugimoto ............... 463/4 |

FOREIGN PATENT DOCUMENTS

| EP | 1 145 746 | 10/2001 |
| JP | 10-201951 | 8/1998 |
| JP | 10-277266 | 10/1998 |
| JP | 2000-325654 | 11/2000 |
| JP | 2001-190837 | 7/2001 |
| JP | 2002-336550 | 11/2002 |

OTHER PUBLICATIONS

Hot Shots Golf 2 screenshots, http://media.psx.ign.com/media/013/013666/img_1223361.html, http://media.psx.ign.com/media/013/013666/img_1223363.html; pp. 1-2.*

(Continued)

*Primary Examiner*—Ronald Laneau
*Assistant Examiner*—Ross A. Williams
(74) *Attorney, Agent, or Firm*—Nixon & Vanderhye P.C.

(57) ABSTRACT

A game machine and a game program are provided which allow a wide variety of players to enjoy a game, represented by a golf game, in which the player performs an operation of moving an object. The present invention provides a golf game machine that displays a scene in which a player character 71 hits a ball in a game field according to a shot power and a hit location. In addition, the golf game machine displays on a display device a gauge 77 and a cursor 78 which moves on the gauge. The golf game machine adopts an auto shot operation, in which a third input is omitted in the shot operation, and a manual shot operation, which requires the third input. This allows a wide variety of players to enjoy the golf game.

36 Claims, 11 Drawing Sheets

OTHER PUBLICATIONS

"Microsoft Golf 2001" written by Scott Steinberg on Sep. 6, 2000, retreived Mar. 30, 2007 from http://pc.ign.com/articles/165/165350p1.html.*

Hot Shots game manual, Released Feb. 29, 2000.*

"Complete Solution Series 3A for Gameboy, Mario Golf GB, Absolute Solution Guide", Fighting Studio, Futabasha Publishers Ltd., Japan, pp. 1-15a, Oct. 15, 1999, First Edition, with translation.

* cited by examiner

FIG. 7A

| TYPE OF CLUB | BASIC MEET AREA | BASIC RANDOM AREA |
|---|---|---|
| CLUB A | MEET AREA A | RANDOM AREA A |
| CLUB B | MEET AREA B | RANDOM AREA C |
| CLUB C | MEET AREA C | RANDOM AREA C |
| ⋮ | ⋮ | ⋮ |

FIG. 7B

| LIE | COEFFICIENT |
|---|---|
| FAIRWAY A | 100% |
| FAIRWAY B | 90% |
| FAIRWAY C | 80% |
| ROUGH A | 60% |
| ROUGH B | 50% |
| BUNKER A | 90% |
| BUNKER B | 60% |
| ⋮ | ⋮ |

REFERENCE POSITION
(BEFORE CURSOR
STARTS MOVING)

FIRST POSITION
(DETERMINATION OF
POWER)

SECOND POSITION
(DETERMINATION OF HIT
LOCATION)

GAME MACHINE, GAME PROGRAM, AND INFORMATION STORAGE MEDIUM

FIELD OF THE INVENTION

The present invention relates to a game machine and a game program. More particularly, the present invention relates to a game machine and a game program which allow an object to move in a virtual field.

BACKGROUND AND SUMMARY OF THE INVENTION

Conventionally, golf games are available, which offer the experience of playing golf on a virtual golf course. In conventional golf games, pseudo golf play proceeds with a player character hitting a ball (hereinafter also referred to as "shot"). In conventional golf games, the operation of hitting the ball (shot operation) generally requires making three inputs via particular buttons of the controller of the game machine. In addition, it is common that in shot operation a gauge with a cursor which moves in response to the shot operation is displayed, to clearly, visually show button input timing.

An exemplary illustration of the operation of performing the aforementioned three inputs is described with reference to FIGS. 11A to 11C. In the description, an example is provided in which the above gauge is displayed. FIGS. 11A to 11C are illustrations showing exemplary displays of the gauge used in shot operation in a conventional golf game. FIG. 11A is an illustration showing a gauge at the start of a shot operation. In the shot operation, the player performs three inputs in total to controller buttons. A first input corresponds to an operation of starting a shot, a second input corresponds to an operation of determining shot power (strength of shot), and a third input corresponds to an operation of determining a hit location of a ball for the shot.

Before starting a shot operation, a cursor 92 in a gauge 91 is positioned at a line 93 which indicates a reference position. The reference position indicates the position of the cursor at the time of starting a shot operation, and is a position which serves as the reference for determining the hit location of the ball. When the player performs a first button input, the shot operation starts. That is, the cursor 92 displayed at the position of the line 93 starts moving at a constant speed in the left direction, in response to the first button input (see FIG. 11B). Thereafter, the cursor 92 reverses at the left end of the gauge 91 and moves back to the right end of the gauge 91, unless a third input is performed. The second input is performed while the cursor 92 is moving.

FIG. 11B is an illustration showing the gauge at the time of the second button input in the shot operation. When the player performs the second button input, the strength at which the ball is hit is determined. That is, the position of the cursor 92 at the time of the second button input (first position) indicates the shot power. Specifically, the longer the distance between the reference position and the first position, the greater the shot power. A line, which indicates the first position, is continuously displayed even after the second button input is performed (see FIG. 11C).

FIG. 11C is an illustration showing the gauge at the time of the third button input in the shot operation. When the third button input is performed, the hit location for hitting the ball is determined. That is, the cursor being moved stops in response to the third button input. The stop position of the cursor, i.e., the position of the cursor 92 at the time of the third button input (second position), indicates the hit location of a ball for a shot. The direction in which the shot ball travels is related to the hit location, and thus by determining the second position the direction in which the ball travels is determined. Specifically, if the second position deviates to the right side from the reference position (i.e., the timing of performing the third button input by the player is too late), a ball is hooked and therefore the ball curves to the left side. By contrast, if the second position deviates towards the left side from the reference position (i.e., the timing of performing the third button input by the player is too early), a ball is sliced and therefore the ball curves to the right side. Thus, the closer the hit location to the reference position, the more chance the player has of hitting the ball straight.

The carry, direction, etc. of the ball are calculated according to the shot power and hit location determined in the manner described above, and a scene in which the ball is traveling is displayed. The player can hit his/her desired shot by adjusting the timing of performing the aforementioned three button inputs.

The above-described operation of performing three button inputs (three input operations) is employed not only in the shot operation for golf games but also in various operations of moving an object, such as a cast operation of casting bait in a fishing game and an operation of kicking a ball in a football game.

Players of, for example, golf games include elderly people and young children as well as beginners who are not familiar with playing games, and therefore, some of them may find the above three input operations difficult. In particular, the third button input (the operation of determining the hit location) usually requires precise input timing for achieving a desired shot, and thus even with a small delay in input timing, the direction of hitting the ball may deviate greatly from the player's desired direction. Thus, players who cannot perform the three input operations well are unable to hit the ball well, making it difficult for the players to fully enjoy, for example, conventional golf games.

In golf games, as in real golf, the player enjoys thinking about how to conquer the course, in addition to enjoying hitting the ball well. However, players who cannot hit the ball well are not as likely to enjoy thinking about how to conquer the course. Thus, in conventional golf games, players who are not good at performing the three input operations are unable to hit the ball well, and accordingly the players are not as likely to enjoy the other pleasure of golf games, such as, thinking about how to conquer the course.

As described above, in conventional golf games, because of the difficulty of shot operation, some players cannot fully enjoy the true nature of the golf game.

For easier shot operation, for example, the third button input may be omitted. In this method, instead of determining the hit location of the ball by the third button input by the player, the hit location is determined at a predetermined location by the game machine. This makes it possible for the player to perform the shot operation well only with the above-described first and second button inputs, without the third button input. However, with this method, the player can hit his/her desired shot too easily and thus the difficulty level of the game gets too low. As a result, advanced players who are familiar with playing games find that such a game is not enough of a challenge. In other words, the method of simply omitting the third button input facilitates the shot operation, but impairs the nature of the game, such as complexity and profundity of the golf game.

Therefore, a feature of the present exemplary embodiments is to provide a game machine and a game program which allow a wide variety of players to enjoy a game, represented by a golf game, in which the player performs an operation of moving an object.

Another feature of the present exemplary embodiments is to provide a game machine and a game program which allow the player to fully enjoy the true nature of the golf game.

Still another feature of the present exemplary embodiments is to provide a game machine and a game program which realize a golf game with easy operation and an enhanced nature.

In order to overcome the foregoing problems, the present exemplary embodiments employ the following configurations. It is to be understood that reference numerals, supplemental remarks, etc. in parentheses are provided, for the purpose of helping to understand the present exemplary embodiments, to show the corresponding relationship with an embodiment, as will be described later, and thus are not intended to limit the scope of the present invention. The present exemplary embodiments have the following features to attain the features mentioned above.

A first aspect of an exemplary embodiment is directed to a golf game machine (3) which displays on a display device (2) a scene in which a ball hit by a player character (71) is traveling in a game field according to a shot power and a hit location. In addition, the golf game machine displays on the display device a gauge (77) and a cursor (78) moving on the gauge. The shot power is set in relation to a first position of the cursor being moved. The hit location is set in relation to a second position at which movement of the cursor stops. The golf game machine comprises: a controller (6) having a plurality of control switches; a moving start processing mechanism (a CPU 31 for performing S3 and S5; hereinafter simply only step numbers are provided); an input receiving mechanism (S12); a first position determining mechanism (S17, S32, and S36); and a second position determining mechanism (S17 and S24). The moving start processing mechanism receives a first input to the controller and allows the cursor to start moving in response to the first input. The input receiving mechanism receives, as a second input to the controller, an input to a first control switch (63) among the plurality of control switches or a second control switch (62) among the plurality of control switches which is different from the first control switch. The first position determining mechanism determines, when the second input to the first control switch is received by the input receiving mechanism, a position of the cursor at the time of receiving the second input as the first position. In addition, the first position determining mechanism receives a third input to the controller and determines a position of the cursor at the time of receiving the third input as the second position. The second position determining mechanism determines, when the second input to the second control switch is received by the input receiving mechanism, a position of the cursor at the time of receiving the second input as the first position, and determines a given position on the gauge as the second position.

According to the above aspect, by inputting either the first control switch or the second control switch for the second input which is performed subsequent to the first input, the player can select either the function of performing an operation in which the third input is omitted (auto shot operation function) or the function of performing an operation which requires the third input (manual shot operation function). Thus, the auto shot operation function with easy shot operation and the manual shot operation function which allows detailed operation can coexist in a series of shot operation. Accordingly, the player can select either one of the operations according to his/her skill level in the game. In addition, the player can select either one of the operations according to his/her skill level of a golf course and the difficulty level of "lie" (i.e., state of a ball at rest). Thus, according to this aspect, a golf game machine can be provided which allows a wide variety of players, such as beginner, young, and advanced game players, to enjoy the golf game.

Further, by selecting the auto shot operation function, even players who are not good at performing shot operation can hit his/her ideal (or close to ideal) shot. Therefore, any player can experience the pleasure of the golf game, "thinking about how to conquer the course," which players who are not good at shot operation cannot experience in conventional golf games. Thus, according to the present aspect, a game machine can be provided which allows the player to fully enjoy the true nature of the golf game.

Moreover, according to the above-described aspect, the selection of shot function can be made, without the need to perform complicated setting operation, more easily than the case where the auto shot operation function and the manual shot operation function need to be preset every time a shot is made. For example, a game machine which merely adopts two operations, i.e., manual shot operation and auto shot operation, requires the selection operation of selecting one of the two operations. In this case, the player needs to perform the selection operation in addition to shot operation. For example, in cases where the player needs to perform the selection operation every time the player switches between the two operations, the operation becomes very tricky. In addition, in cases, for example, where a plurality of players take turns controlling one player character, the selection operation needs to be performed every time the player is switched, making the operation very tricky. Thus, in a game machine which merely adopts the above two operations, the effect of freely selecting the two operations is halved due to the above-described tricky selection operation. On the other hand, according to the present aspect, since the player does not need to perform the selection operation in addition to shot operation, the player can easily select either one of the two operations, making it possible to provide an easy-to-use game machine.

The second position determining mechanism may determine the second position so as to be randomly positioned every time the second input to the second control switch is received by the input receiving mechanism. That is, the second position is determined, every time a shot is made, to be at a random position on the gauge, and the hit location of the ball which is set in relation to the second position, is also determined randomly.

With the above configuration, even when the auto shot operation function is selected, because the hit location is randomly set, the player's ideal hit location is not always fixedly set. In other words, if, in the auto shot operation, the hit location is always at a fixed location, the player who performs the auto shot operation can hit an ideal shot every time, making the shot operation extremely easy, which may possibly impair the nature of the game, such as complexity and profundity of the golf game. On the other hand, according to the present aspect, even if the same operation is performed every time a shot is made, because the hit location is determined on a random basis, even when the auto shot operation function is selected, the shot operation cannot become too easy, and thus the nature of the game of the golf game cannot be impaired.

The golf game machine may further comprise a control-switch image display mechanism (S11). The control-switch image display mechanism displays on the display device a first image and a second image (82*b*) after the first input is received by the moving start processing mechanism, the first image representing the first control switch, the second image representing the second control switch.

According to the above configuration, after performing the first input, control switches, which are available for the second input, are displayed. This makes it possible to clearly inform the player of which control switch to input next. In addition, this makes it possible to inform the player that there are two types of control switches that the player should input for the second input (in conventional golf games, there is only one type of control switch).

The golf game machine may further comprise a spin direction receiving mechanism (S39), a first direction setting mechanism (S41), and a second direction setting mechanism (S44). The spin direction receiving mechanism receives, as the third input, an input to a third control switch (62) or a fourth control switch (63) which is different from the third control switch, to select a spin direction of the ball. The first direction setting mechanism sets, when the input to the third control switch is received by the spin direction receiving mechanism, the spin direction of the ball to a first direction. The second direction setting mechanism sets, when the input to the fourth control switch is received by the spin direction receiving mechanism, the spin direction of the ball to a second direction which is different from the first direction. In this configuration, the scene in which the player character hits the ball is displayed according to at least the shot power, the hit location, and the spin direction.

According to the above configuration, two types of control switches are assigned to the third input, and thus it is possible to change the spin direction of the ball by shot operation. That is, the player can set, by shot operation, the spin direction of the ball in addition to the shot power and hit location. This increases the variation of shot operation, enhancing the nature of the game of the golf game. For example, when the first direction is set as the topspin direction and the second direction is set as the backspin direction, it is possible to put topspin or backspin on the ball by shot operation.

The golf game machine may further comprise a spin strength receiving mechanism (S41 and S44). The spin strength receiving mechanism further receives, after the third input is received by the spin direction receiving mechanism, an input to the third control switch or the fourth control switch as a fourth input, to select a spin strength of the ball. In this configuration, the first direction setting mechanism changes a spin strength of the first direction of the ball depending on when the input to the third control switch is received by the spin strength receiving mechanism and when the input to the fourth control switch is received by the spin strength receiving mechanism. The second direction setting mechanism changes a spin strength of the second direction of the ball depending on when the input to the third control switch is received by the spin strength receiving mechanism and when the input to the fourth control switch is received by the spin strength receiving mechanism.

According to the above configuration, by receiving, after performing the third input, another input (fourth input), the spin strength can be changed. This allows the player to set, by the shot operation, the spin strength, as well as the spin direction of the ball. Accordingly, the variation of shot operation can be further increased, thereby enhancing the nature of the game of the golf game.

Moreover, the golf game machine may further comprise a history image display mechanism (S45). The history image display mechanism displays on the display device, when the second input to the first control switch is received by the input receiving mechanism, a history image (82d to 82g) showing a history of the control switches inputted as the third and fourth inputs.

According to the above configuration, the results of the third and fourth inputs which are inputted by the player are displayed. This allows the player to see the operation performed by the player, and thus the player can know whether the operation performed by the player is the player's desired operation or a misoperation.

A second aspect of an exemplary embodiment is directed to a golf game machine (3) which displays on a display device (2) a scene in which a ball hit by a player character (71) is traveling in a game field according to a shot power and a hit location. In addition, the golf game machine displays on the display device a gauge (77) and a cursor (78) moving on the gauge. The shot power is set in relation to a first position of the cursor being moved. The hit location is set in relation to a second position at which movement of the cursor stops. The golf game machine comprises: a controller (6) having a plurality of control switches; a moving start processing mechanism (S3 and S5); input receiving mechanism (S12); and a second position determining mechanism (S17). The moving start processing mechanism receives a first input to the controller and allows the cursor to start moving in response to the first input. The input receiving mechanism receives a second input to the controller. The second position determining mechanism determines, as the first position, a position of the cursor at the time of receiving the second input performed by the input receiving mechanism and, as the second position, a given position on the gauge.

According to the above configuration, because the input for determining the hit location (third input), which is required in a conventional shot operation, is not required, the player can easily perform shot operation. In the operation in which the third input is omitted, such as the one in the present aspect, in cases where the hit location is always at a fixed location, the player can hit an ideal shot every time. This makes the shot operation extremely easy, impairing the nature of the game, such as complexity and profundity of the golf game. On the other hand, according to the present aspect, because the hit location is set randomly, the hit location cannot always be set at the ideal location. Therefore, the shot operation cannot get too easy, and thus the nature of the game of the golf game cannot be impaired. Hence, according to the present aspect, a game machine is provided which realizes a golf game with easy operation and an enhanced nature.

In the above-described first and second aspects, the golf game machine may further comprise a range setting mechanism (S2). The range setting mechanism sets a range (80) on the gauge and changes a width of the range in response to at least one condition selected from the group consisting of circumstances (lie) of the ball, a golf club selected by a player, and characteristics of the player character. In this configuration, the second position determining mechanism determines the second position so as to be randomly positioned within the range set by the range setting mechanism.

According to the above configuration, the range, in which the hit location is randomly set, changes in response to at least one condition selected from the group consisting of circumstances of the ball, a golf club selected by a player, and characteristics of the player character. The circumstances of the ball are based on the concept which includes, for example, the lie of the ball and the brightness of the light which hits the ball. The characteristics of the player character is based on the concept which includes not only the skill value inherent in a player character, but also, the rank, score, etc. of, in cases where a plurality of player characters play at a time, each player character. In the present aspect, the range, in which the hit location can be set, is changed according to the above-described various parameters. By changing the range in which the hit location can be set, the probability of hitting an ideal shot is accordingly changed. As described above, according to the above configuration, the probability of shot can be changed in response to various circumstances of the game, and therefore it is possible to provide a golf game with an enhanced nature.

The golf game machine may further comprise an area display mechanism (S2). The area display mechanism displays on the display device a random area (80), indicating the range set by the range setting mechanism, and a meet area (81), serving as an index for determining the second position, along with the gauge.

According to the above configuration, the meet area, which serves as the index for determining the second position, and the random area, which indicates the range in which the second position, randomly determined, can lie, are displayed. By showing to the player the relationship between such meet area and the random area, the strategy of shot operation performed by the player can be enhanced. Specifically, because the range of the random area changes in response to the situation of the game, by checking the relationship between the random area and the meet area, the player can visually understand the current game situation. For example, if the range of the random area changes in response to the state of lie and the type of club, and the range of the random area is narrower than that of the meet area, the player can evaluate, by viewing the above relationship displayed on the screen, whether the state of lie is good or bad and which club to select, and thus the player can objectively evaluate the difficulty level of the shot. In addition, in cases where the player can select either the manual shot operation function or the auto shot operation function, the player can, by viewing the relationship between the random area and the meet area, evaluate which shot operation to select. For example, if the range of the random area is wider than that of the meet area, the player can see that even if selecting the auto shot operation function the probability of hitting an ideal shot is low, and thus in such a case, the player would select the manual shot operation. As in the above example, by showing to the player the relationship between the meet area and the random area, the player can understand the game situation and can evaluate a shot appropriate to the situation. Thus, according to the above configuration, a golf game with an enhanced nature and high strategy can be provided.

In the above-described first and second aspects, the second position determining mechanism may randomly determine the second position according to a random number.

According to the above configuration, by using a random number, the second position can be easily set randomly.

The golf game machine may further comprise a moving-direction calculation mechanism. The moving-direction calculation mechanism calculates a moving direction of the ball in the game field according to the shot power and the hit location.

The golf game machine may further comprise a tentative hit-location setting mechanism. The tentative hit-location setting mechanism receives, prior to start of movement of the cursor by the moving start processing mechanism, an input of a player's desired tentative hit location on a circular shaped image, which is modeled on the ball displayed on the display device, and sets the tentative hit location. In this configuration, the moving-direction calculation mechanism determines a final hit location by adjusting the tentative hit location according to the second position on the gauge determined by the second position determining mechanism and calculates the moving direction of the ball according to the final hit location and the shot power.

The moving-direction calculation mechanism may determine the final hit location by adjusting the tentative hit location according to a deviation between a meet point displayed on the gauge and the second position.

A third aspect of an exemplary embodiment is directed to a golf game machine (3) which displays on a display device (2) a scene in which a ball hit by a player character 71 is traveling in a game field according to a shot power and a hit location. In addition, the golf game machine displays on the display device a gauge (77) and a cursor (78) moving on the gauge. The shot power is set in relation to a first position of the cursor being moved. The hit location is set in relation to a second position at which movement of the cursor stops. The golf game machine comprises: a controller (6) having a plurality of control switches; a moving start processing mechanism (S3 and S5); a first position determining mechanism (S12 and S17); a second position determining mechanism (S32 and S36); and third position determining mechanism (S24). The moving start processing mechanism receives a first input to the controller and allows the cursor to start moving in response to the first input. The first position determining mechanism receives a second input to the controller and determines, as the first position, a position of the cursor at the time of receiving the second input. The second position determining mechanism receives, when the first and second inputs to the control switches present a first input pattern, a third input to the controller, and determines, as the second position, a position of the cursor at the time of receiving the third input. The third position determining mechanism determines, when the first and second inputs to the control switches present a second input pattern which is different from the first input pattern, a given position on the gauge as the second position.

According to the above configuration, as in the first aspect, the selection between the manual shot operation function and the auto shot operation function can be made during the shot operation, and therefore the same effects can be obtained as those obtained by the first aspect. The selection between the manual shot operation function and the auto shot operation function can be made according to the input pattern presented by the first and second inputs to the control switches. Therefore, the selection between the manual shot operation function and the auto shot operation function may be made by the first input or alternately by the second input. In addition, such a selection may be made by the combination of the first and second inputs (input pattern).

A fourth aspect of an exemplary embodiment is directed to a game machine (3) which displays on a display device (2) a scene in which an object (ball) moves (is shot) in a game field according to a parameter of a moving distance of the object (shot power) and a parameter of a moving direction of the object (hit location). In addition, the game machine displays on the display device a gauge (77) and a cursor (78) moving on the gauge. The parameter of the moving distance of the object is set in relation to a first position of the cursor being moved. The parameter of the moving direction of the object is set in relation to a second position at which movement of the cursor stops. The game machine comprises: a controller (6) having a plurality of control switches; a moving start processing mechanism (S3 and S5); an input receiving mechanism (S12); a first position determining mechanism (S17, S32, and S36); and second position determining mechanism (S17 and S24). The moving start processing mechanism receives a first input to the controller and allows the cursor to start moving according to the first input. The input receiving mechanism receives, as a second input to the controller, an input to a first control switch (63) among the plurality of control switches or a second control switch (62) among the plurality of control switches which is different from the first control switch. The first position determining mechanism determines, when the second input to the first control switch is received by the input receiving mechanism, a position of the cursor at the time of receiving the second input as the first position. In addition, the first position determining mechanism receives a third input to the controller and determines, as the second position, a position of the cursor at the time of receiving the third input. The second position determining mechanism determines, when the second input to the second control switch is received by the input receiving mechanism, a position of the cursor at the time of receiving the second input as the first position, and determines a given position on the gauge as the second position.

According to the above configuration, not only in golf games but also in games in which the player performs the operation of moving an object, the player can make a selection between the operation that requires the third input (manual shot operation) and the operation in which the third input is omitted (auto shot operation). Accordingly, the same effects as those obtained by the first aspect can be provided to games other than golf games. For example, the same effects as those obtained by the first aspect can be provided to fishing games, football games, etc.

The above aspect may be provided in the form of a game program to be executed by the computer of the game machine. That is, the functions described in the above first to fourth aspects may be provided to the game machine by a game program. In addition, the functions may be provided in the form of a storage medium having stored thereon such a game program.

These and other objects, features, aspects and advantages of the present exemplary embodiments will become more apparent from the following detailed description of the present invention when taken in conjunction with the accompanying drawings.

BRIEF DESCRIPTION OF THE DRAWINGS

FIGS. 7A and 7B are drawings showing examples of tables used for determining the ranges of a random area 80 and a meet area 81;

DESCRIPTION OF THE PREFERRED EMBODIMENTS

Figure 1:
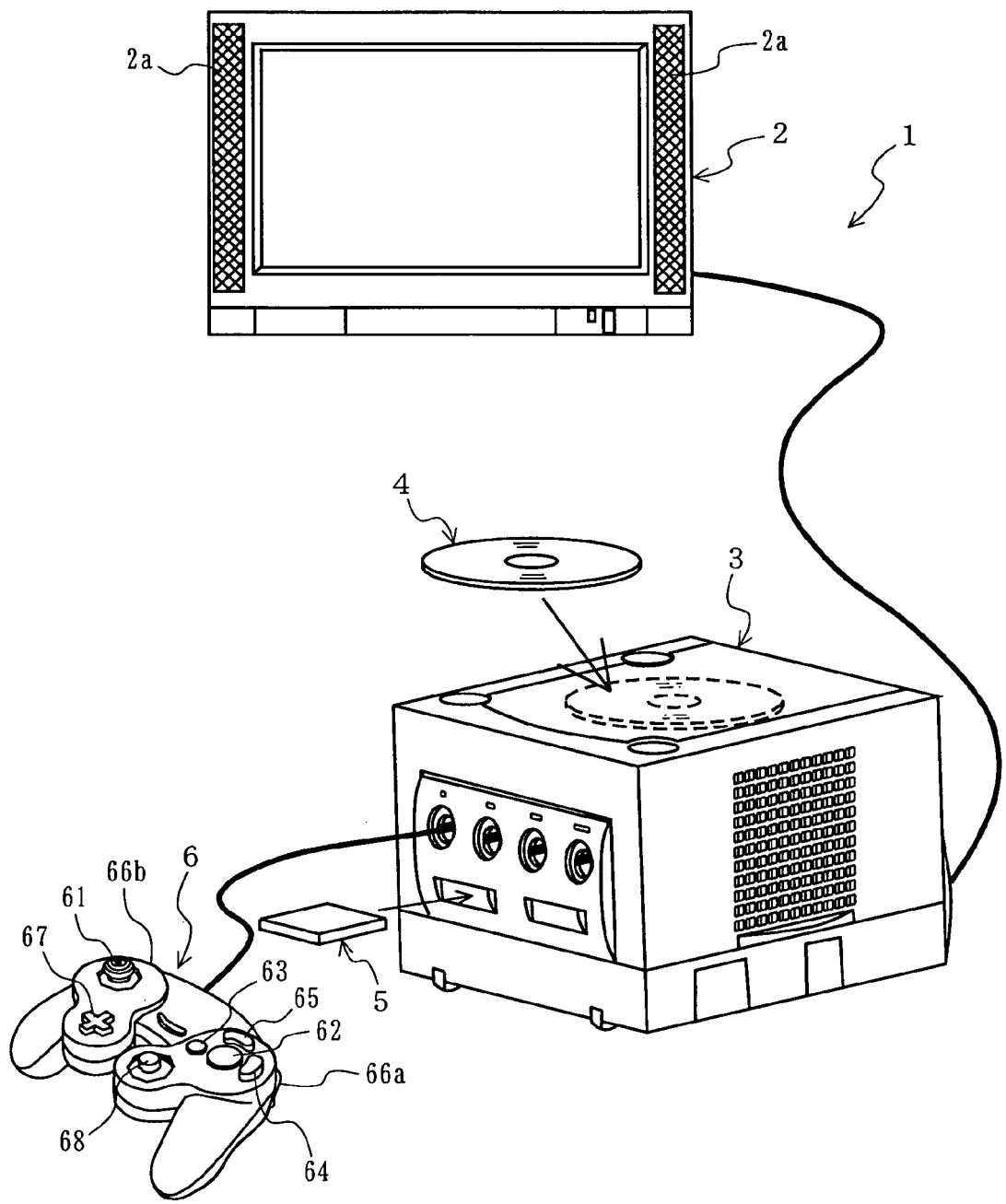
FIG. 1 is an external view illustrating a game machine 3 according to an embodiment of the present invention.

A game machine 3 according to one embodiment of the present invention is described below. FIG. 1 is an external view illustrating a game system 1 including the game machine 3. It is to be noted that the game machine of the present invention is described using a stationary game machine as an example, but is not limited thereto; the present invention can also be applied, for example, to portable game machines, arcade game machines, portable terminals, mobile phones, and devices having a computer that executes a game program, such as personal computers.

In FIG. 1, the game system 1 includes the stationary game machine (hereinafter simply referred to as the game machine) 3 and a television receiver (hereinafter referred to as the TV) as an example of a display device connected to the game machine with a connection cord. The TV 2 is provided with speakers 2a for outputting music, such as background music, and sounds during the game. To the game machine 3 is connected a controller 6 with a plurality of control switches which can be operated by the player. In addition, an optical disk 4, an example of an information storage medium having stored thereon a game program, is provided and can be attached to and detached from the game machine 3 at will. Further, a memory card 5, which includes, for example, flash memory for storing save data of the game, etc., is provided and can be inserted into and removed from the game machine 3 at will, as necessary. The game machine 3 displays on the TV 2 a game image obtained by executing the game program stored on the optical disk 4. The game machine 3 is also capable of reproducing, by using save data stored in the memory card 5, a previous state of the game and displaying its game image on the TV 2. The player of the game machine 3 can enjoy the game by operating the controller 6 as he/she views the game image displayed on the TV 2.

The controller 6 is connected to the game machine 3 with a connection cord, as is described above, and the connection cord is plugged in and out of the game machine 3 at will. The controller 6 is a control mechanism, which mainly controls a player character appearing in a game space displayed on the TV 2 (which is typically a game's main character, as an object to be controlled by the player), and has an input portion including a plurality of control switches, such as control buttons, a key, and sticks. Specifically, the controller 6 has grip portions that are gripped by a player. The controller 6 includes a main stick 61 and a cross key 67 which can be operated, for example, with the thumb of the player's left hand, and a C stick 68, an A button 62, a B button 63, an X button 64, a Y button 65, and a start-pause button 69 which can be operated, for example, with the thumb of the right hand. Furthermore, the controller 6 includes an R button 66a which can be operated, for example, with the index finger of the player's right hand, and an L button 66b which can be operated, for example, with the index finger of the player's left hand.

The player can enjoy a golf game, as will be described later, by operating the controller 6, for example, such that by operating the main stick 61 leftward or rightward the shot direction (i.e., the launch direction of the ball) is specified, and by operating the main stick 61 upward or downward the type of club to be used is selected. By operating the cross key 67 upward, downward, leftward, or rightward, the hit location of the ball on the shot is specified. The A button 62 and the B button 63 are used to determine the shot action of a player character. Specifically, the A button 62 is used, for example, for a shot start (a first input, as will be described later) and the determination of the shot power (a second input, as will be described later). The B button 63 is used, for example, for the determination of the shot power (the second input, as will be described later) and the determination of the hit location of the ball for the shot (a third input, as will be described later). Other control switches may also be used during the course of the game, as will be described later, but since they do not directly relate to the description of the present invention, a detailed description thereof is omitted.

Figure 2:
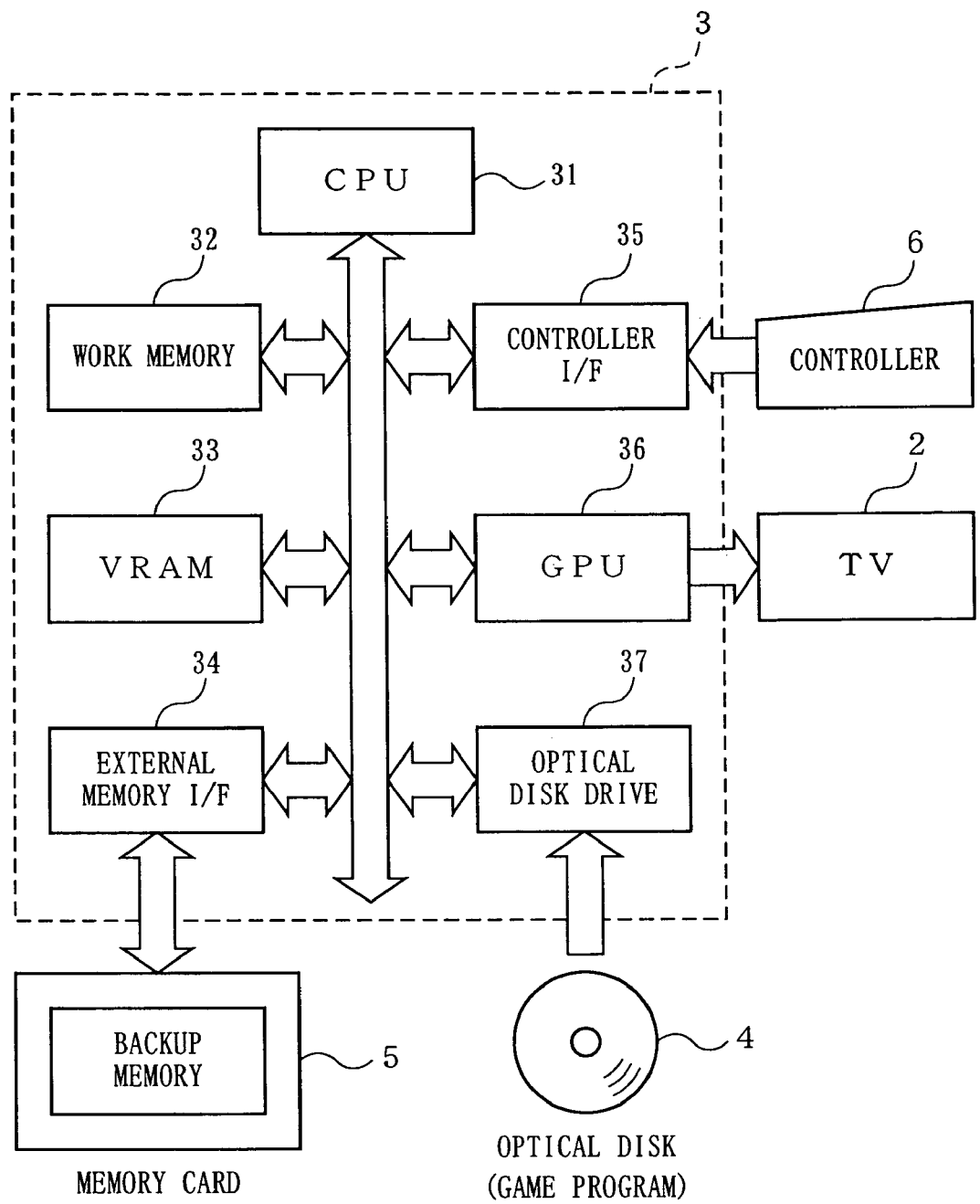
FIG. 2 is a functional block diagram of the game machine 3.

Next, With reference to FIG. 2, the configuration of the game machine 3 is described. FIG. 2 is a functional block diagram of the game machine 3.

In FIG. 2, a game machine 3 includes a 128-bit (for example) CPU (Central Processing Unit) 31 which executes various programs. The CPU 31 executes the start program stored in a boot ROM, which is not shown in the figure, to perform, for example, initialization of memory, such as work memory 32, and executes, after reading a game program stored on an optical disk 4 into the work memory 32, the game program, and then performs game processing according to the game program. To the CPU 31 is connected the work memory 32, a video RAM (VRAM) 33, an external memory interface (I/F) 34, a controller I/F 35, GPU (Graphics Processing Unit) 36, and an optical disk drive 37, via a bus.

The work memory 32 is a storage region used by the CPU 31 and appropriately stores a game program, etc. required for processing by the CPU 31. For example, the work memory 32 stores a game program, various data, etc. read from the optical disk 4 by the CPU 31. The game program, various data, etc. stored in the work memory 32 are executed by the CPU 31. The VRAM 33 stores game image data for displaying game images on a TV 2. The external memory I/F 34 connects between the game machine 3 and a memory card 5 to allow communication therebetween, by joining the memory card 5 to a connecter, which is not shown in the figure. The CPU 31 accesses the backup memory provided in the memory card 5 via the external memory I/F 34. The controller I/F 35 connects between an external device and the game machine 3 with a connector, which is not shown in the figure, to allow communication therebetween. For example, a controller 6 is joined to the connector with a connection cord and connected to the game machine 3 via the controller I/F 35. The GPU 36 includes a semiconductor chip which performs processes, such as vector operation, rendering, etc. required for 3D graphics display, in response to instructions from the CPU 31, and a game image on which rendering has been performed by the GPU 36 is displayed on the TV 2. The optical disk drive 37 reads various data, such as a game program, image data, and sound data, stored on the optical disk 4, in response to instructions from the CPU 31.

Figure 3A:
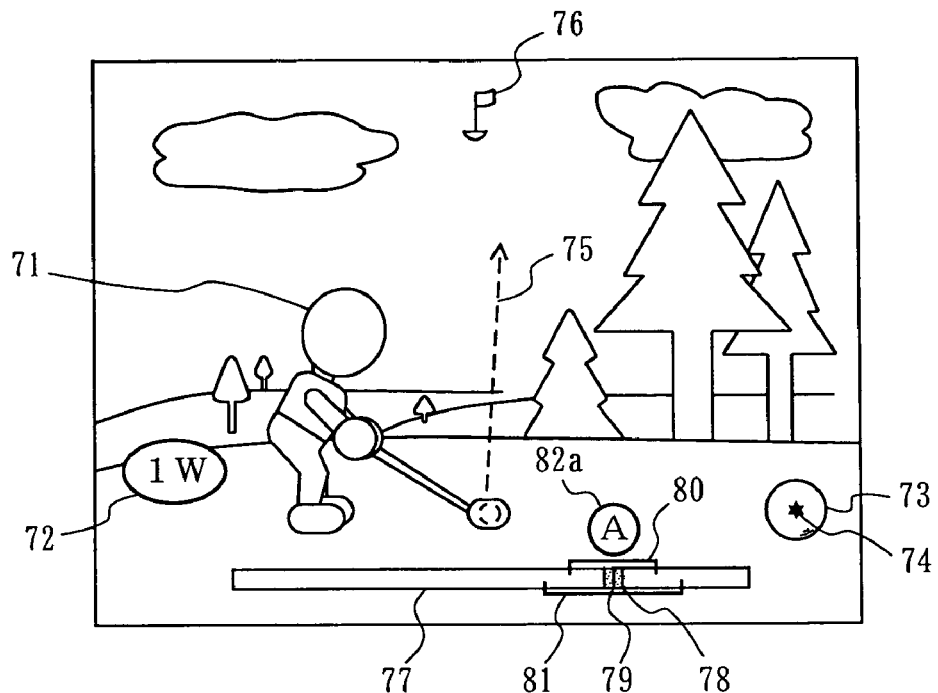
FIGS. 3A and 3B are illustrations showing exemplary screen displays of game images showing a scene in which a player character hits a shot in a golf game to which the present invention is applied.
Figure 3B:
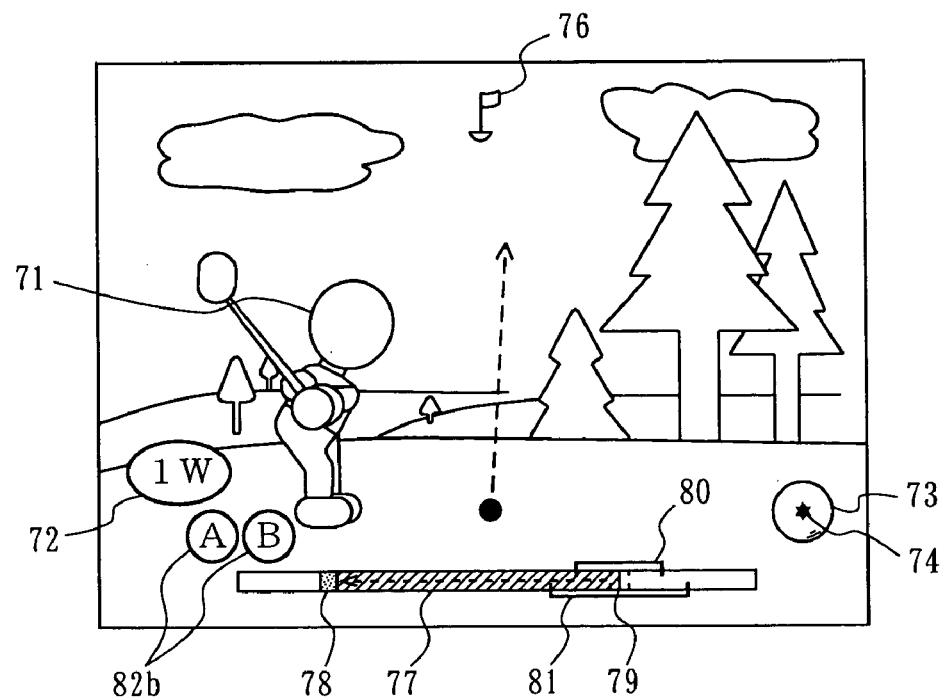

A golf game is described below, which is displayed on the TV 2 by the game machine 3 executing the game program stored on the optical disk 4. FIGS. 3A and 3B are illustrations showing exemplary screen displays of game images in which the player character hits a shot in a golf game to which the present invention is applied. In FIGS. 3A and 3B, a player character 71, in this case a golfer, is displayed on a golf course. FIGS. 3A and 3B are images viewed from behind the player character 71, and over the player character 71 there is displayed a golf course backdrop (hereinafter referred to as the "course backdrop") stretching out ahead of the player character 71. At this screen, by allowing the player to operate the control switches of the controller 6 in predetermined steps, the player character 71 is caused to perform the action of hitting a ball (a shot). Thereby, the ball hit by the player character 71 travels in response to the condition determined by timing of the operation of the player. By allowing the player character to repeatedly perform such an action, the golf game proceeds. FIG. 3A shows an image before the player performs a shot operation, and FIG. 3B shows an image displayed when the player is performing a shot operation.

In the golf game of the present embodiment, the player is allowed to set desired parameters (the type of club (club number) and desired hit location and shot direction) before the player performs a shot operation. The parameters change in response to the shot operation performed by the player, and, according to the changed parameters, a scene is displayed in which the hit ball is traveling. For allowing the player to set these parameters, there are displayed objects, etc. showing information on the parameters. As the operation leading up to the shot operation, the player selects, using the controller 6, the type of club and desired hit location and shot direction, as the player refers to the objects. The operation leading up to the shot operation and a screen display to be referred by the player during such an operation are described below.

In the lower left of the screen, an oval-shaped club-selection object 72 with the type of club shown inside thereof is displayed. The displayed information of the club-selection object 72 shows the type of club currently selected by the player. The type of club is a parameter that affects a ball's carry, a ball's launch angle, the spin direction of the ball, etc. The player can change the type of club by operating the main stick 61 of the controller 6 in the upward or downward direction. In addition, the player can check, by the club-selection object 72, which type of club is currently selected. In FIGS. 3A and 3B, "1W" is displayed, which means that the club currently specified is a driver.

In the lower right of the screen, a circular hit-range object 73 and an astral hit-location object 74 are displayed. The hit-range object 73 has a circular shape which is modeled on the ball, and the location of the hit-location object 74 with respect to the hit-range object 73 indicates the player's desired hit location. The hit location indicates the spot (angle) where the club face contacts the ball upon shot impact, and is a parameter that affects the travel direction of the ball, the amount of curve (the degree to which the ball curves), the angle at which the ball travels, the spin direction of the ball, etc. What is determined by the location of the hit-location object 74 is the player's desired hit location, and the final hit location when displaying a scene in which the ball is traveling is determined in such a manner that the player's desired hit location is adjusted by the shot operation. That is, the player can hit the ball at the desired hit location (i.e., the hit location specified by the hit-location object 74), by stopping a cursor 78, as will be described later, at the right position with respect to a meet point 79. In other words, if the cursor 78 is stopped at a position deviated from the meet point 79, the hit location is adjusted to a location deviated from the desired hit location according to such deviation. The hit-location object 74 can be moved upward, downward, leftward, or rightward by operating the cross key 67 of the controller 6 upward, downward, leftward, or rightward. The player selects a desired hit location as viewing the location of the hit-location object 74 on the game image.

In FIGS. 3A and 3B, a mark 76, which is displayed along with the course backdrop, indicates the direction of the pin. The player determines the shot direction as referring to the course backdrop and the mark 76. The shot direction indicates the direction in which the player character 71 hits a shot, and is a parameter that affects the travel direction of the ball. Specifically, the player can change the shot direction by operating the main stick 61 of the controller 6 in the left or right direction. The course backdrop and the mark 76 moves, by operating the main stick 61 of the controller 6 in the left or right direction, leftward or rightward in response to the operation. This enables the player to select the shot direction as the player checks the course backdrop and the direction of the pin displayed on the screen.

An arrow 75 displayed in the center of the screen indicates the launch direction of the ball, and preferably shows the trajectory of the ball which is predicted by the current parameter. The trajectory indicated by the arrow 75 illustrates a shot hit with the maximum power of the selected club and at an ideal hit location (the player's desired hit location). Therefore, the player can visualize, by the arrow 75, an approximate trajectory of the ball after the shot. The player performs the operation leading up to the shot operation, as the player refers to the course backdrop and objects described above.

After performing the operation leading up to the shot operation, the player determines the shot power and hit location by the shot operation. The shot power indicates the strength of the shot, and is a parameter that affects the ball's carry. In FIGS. 3A and 3B, when the player performs a shot operation, objects, such as a gauge 77, displayed in the lower part of the screen are referred to. On the gauge 77, are displayed the cursor 78 which moves on the gauge 77 and the meet point 79 which indicates a predetermined position on the gauge 77. At the upper side of the gauge 77 a random area 80 is displayed, and at the lower side of the gauge 77 a meet area 81 is displayed. The widths of the random area 80 and the meet area 81 are determined in response to the parameters determined by the above operation leading up to the shot operation. Further, at the upper side of the gauge 77, a button object 82a (see FIG. 3A) and a button object 82b (see FIG. 3B) are appropriately displayed in response to the input from the control switches during the shot operation. With reference to FIGS. 4A to 4D and 5A to 5G, a shot operation performed by the player and a display of the gauge 77, etc. during shot operation are described below.

First, an overview of the shot operation in the golf game according to the present embodiment is described. In the present embodiment, the shot operation provides two types of operation modes, a manual shot operation mode, in which a shot is made with three input operations, and an auto shot operation mode, in which a shot is made with a two-input operation. The player can select either of the two types of shot operation modes during a series of shot operation. Specifically, in the present embodiment, a first input performed by the player is made to the A button 62 of the controller 6, and a second input is made to either the A button 62 or the B button 63. Depending on which button is pressed for the second input, either the manual shot operation mode or the auto shot operation mode is selected. The manual shot operation and the auto shot operation are described in detail below. It is to be again noted that the general golf game requires three inputs for a shot operation; i.e., an input for starting a shot operation, an input for determining shot power, and an input for determining the hit location for the shot.

Figure 4A:
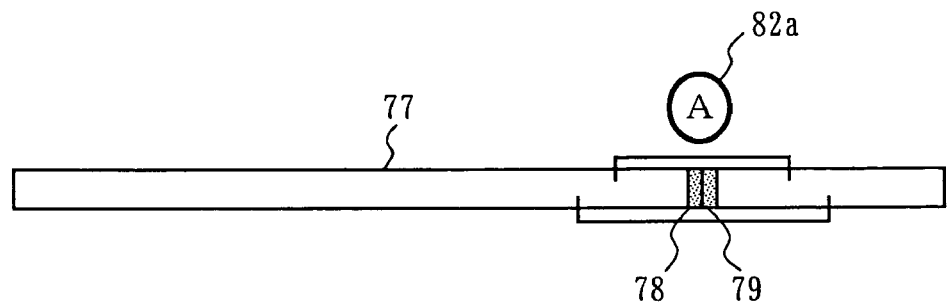
FIGS. 4A to 4D are illustrations showing displays of a gauge 77, etc. in auto shot operation.

FIGS. 4A to 4D are illustrations showing displays of the gauge 77, etc. for an auto shot operation. The auto shot operation is described below along the time sequence, from FIGS. 4A to 4D. FIG. 4A is an illustration showing a display of the gauge 77, etc. in auto shot operation before starting a shot operation. The cursor 78 on the gauge 77, before starting a shot operation, is positioned at the meet point 79 which indicates the reference position. The reference position is a position serving as the reference for determining the hit location, the details of which will be described later. At the upper side of the gauge 77, is displayed the button object 82a which represents the A button 62 of the controller 6. The display of the button object 82a means that the A button 62 should be pressed for the first input, and prompts the player to perform an input to the A button 62 for starting the shot operation. In the state of FIG. 4A, when the player performs the first input, i.e., when the player presses the A button 62, the shot operation commences and the cursor 78 starts moving leftward from the reference position at, for example, constant speed.

Figure 4B:
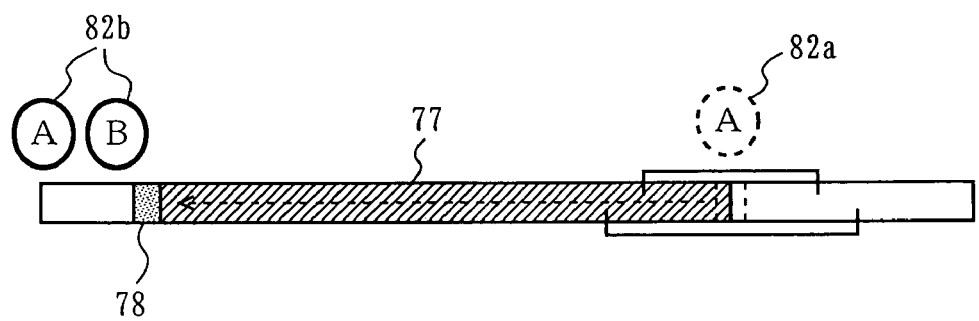

FIG. 4B is an illustration showing a display of the gauge 77, etc. for an auto shot operation upon completion of the first input. After performing the first input, the cursor 78 keeps moving leftward. In addition, after performing the first input, instead of the button object 82a shown in FIG. 4A, the button object 82b, representing the A button 62 and the B button 63 of the controller 6, is displayed in the vicinity of the maximum value (left end) of the gauge 77 (i.e., the button object 82a shown by the dotted line is not displayed in practice). The display of the button object 82a means that the A button 62 or the B button 63 should be pressed for the second input, and prompts the player to perform an input to the A button 62 or the B button 63 for determining the shot power. By this button object 82b, the player can specifically know which control switch should be inputted next. The button object 82b is displayed in such a manner that a display representing the A button 62 and a display representing the B button 63 are emphatically displayed in turn. For example, the display representing the A button 62 and the display representing the B button 63 are displayed alternately flashed or with different colors or displayed alternately enlarged. This makes it possible to clearly inform the player of which button, the A button 62 or the B button 63, should be pressed.

In the state of FIG. 4B, when the player performs the second input, i.e., when the player presses either the A button 62 or the B button 63, the shot power is determined. That is, the shot power is determined according to the position of the cursor 78 at the time of performing the second input (hereinafter referred to as the "first position"). Specifically, the closer the first position is to the left end of the gauge 77, i.e., the longer the distance between the reference position and the first position, the greater the shot power becomes. If the second input is not performed before the cursor 78 reaches the left end of the gauge 77, the cursor 78 reverses at the left end of the gauge 77 and starts moving back in the right direction. Further, if the second input is not performed even after the cursor keeps moving in the right direction and reaches the reference position, the shot operation is redone. That is, the display of the gauge 77, etc. returns to the state of FIG. 4A.

By the second input performed by the player, either the manual shot operation mode or the auto shot operation mode is selected. Specifically, when the second input is made to the A button 62, the auto shot operation mode is selected, and when the second input is made to the B button 63, the manual shot operation mode is selected. Depending on which operation is selected, the subsequent shot operation varies. In the description of FIGS. 4A to 4D, it is assumed that the A button 62 is pressed and thus the auto shot operation mode is selected.

Figure 4C:
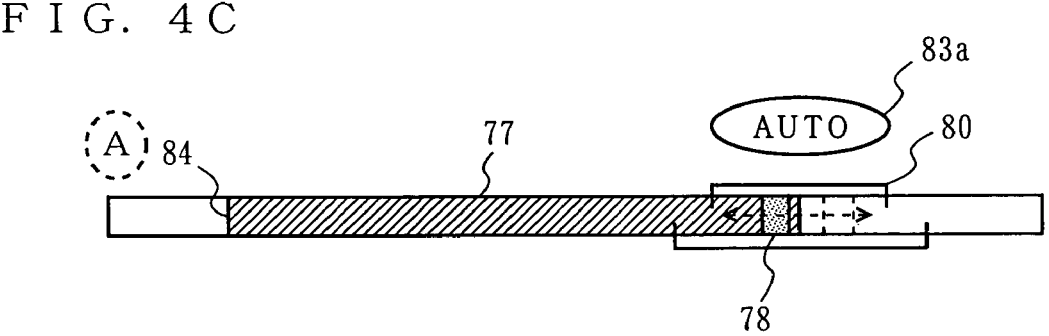

FIG. 4C is an illustration showing a display of the gauge 77, etc. for an auto shot operation upon completion of the second input. FIG. 4C is an illustration showing the case where the A button 62 is pressed for the second input. The button object shown by the dotted line in FIG. 4C is not displayed in practice. When the second input is performed, the display position of the cursor 78 changes to a position inside the random area 80, and the cursor 78 moves back and forth in the random area 80. In addition, when the second input is performed, a shot operation selection object 83*a*, which displays "AUTO", is displayed at the upper side of the gauge 77, as shown in FIG. 4C. The shot operation selection object 83*a* indicates that the auto shot operation mode has been selected by the second input. Thereby, the player is able to know which type of shot operation (either the manual shot operation or the auto shot operation) the player has selected. As is shown in FIG. 4C, a line 84, which indicates the first position, continues to be displayed even after the second input has been performed. In addition, a portion of the gauge 77 between the first position and the reference position is displayed in a different color. By these displays, the player can visually grasp the shot power determined by the second input.

Figure 4D:
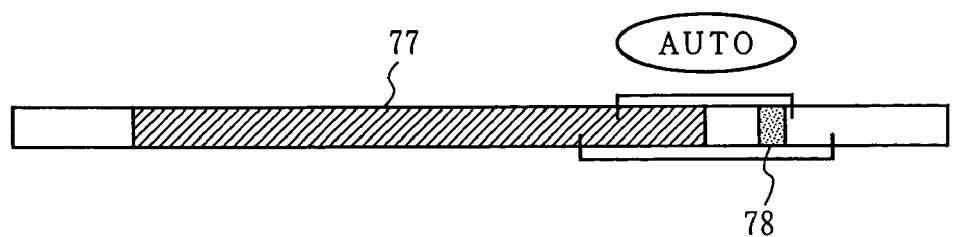

FIG. 4D is an illustration showing a display of the gauge 77, etc. at the time of completion of the auto shot operation. The cursor 78 repeats the above back and forth movement for a predetermined time (see FIG. 4C), and thereafter, stops at a random position in the random area 80, and thus the auto shot operation completes. Here, the game machine 3 stops the cursor 78 such that the cursor is stopped at a random position every time the shot operation is performed. By stopping the cursor 78, the hit location for the shot is determined. In other words, the final hit location for the shot is adjusted according to the stop position of the cursor 78 (hereinafter referred to as the "second position"). Specifically, the final hit location is adjusted so as to be deviated from the player's desired hit location in response to the deviation between the second position and the reference position. In auto shot operation, the game machine 3 determines the shot power and hit location in the manner described above, and displays a scene in which the ball is traveling, according to these parameters, the parameters determined by the operation leading up to the shot operation, etc.

In the present embodiment, the hit location is set in such a manner that the player's desired hit location is adjusted by the second position. As long as the hit location is set in relation to the second position, any calculation method can be employed. For example, in another embodiment, the hit location may be determined according to the second position. Specifically, when the second position corresponds to the reference position, the hit location is in the center of the ball; therefore, the hit location may be set so as to be deviated to the right (left) side from the center of the ball in response to the level to which the second position is deviated to the right (left) from the reference position. In addition, the calculation method of the hit location may be performed by, for example, using a time from the point of performing the second input to the point of performing the third input. Since the second position is determined by such a time, even with this method, the hit location is set in relation to the second position.

As is described above, in auto shot operation, because the player is not required to perform an input for determining the hit location, it becomes possible for the player to perform a shot operation more easily compared to the case of a manual shot operation, as will be described later. In addition, since the second position for determining the hit location is positioned within the range of the random area 80, the ball can be hit nearly at the player's desired hit location. Therefore, regardless of whether the player is good or bad at shot operation, the player can hit a shot nearly in the way the player desires. For example, for beginner players who are not familiar with shot operation or players who put an emphasis on conquering the course for the joy of the game, it may be appropriate to select the auto shot operation mode. Even for advanced players, at times when a severe shot is not demanded, for example, at times when the player plays an easy course, the player can perform a shot operation easily by the auto shot operation. Since the second position is determined at random within the random area 80, the hit location is not always set at the location where the player desires. Therefore, the game cannot get extremely easy and thus the nature of the game of the golf game is not impaired. Conversely, the point "the player cannot always hit a shot in the way the player desires" is something that is encountered in the actual golf play, and thus it could be said that by selecting the auto shot operation mode, the player can play a more realistic golf game.

Figure 5A:
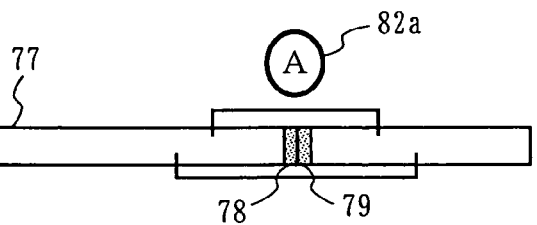
FIGS. 5A to 5G are illustrations showing displays of the gauge 77, etc. in manual shot operation.
Figure 5B:
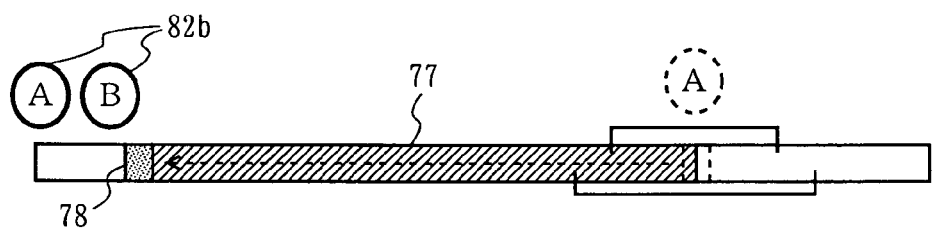

FIGS. 5A to 5G are illustrations showing displays of the gauge 77, etc. in manual shot operation. As described above, since the selection between the manual shot operation mode and the auto shot operation mode is made by the second input, the operation and display of the manual shot operation before the second input is performed are the same as those of the auto shot operation. Accordingly, a display shown in FIG. 5A is the same as that in FIG. 4A, and a display shown in FIG. 5B is the same as that in FIG. 4B, and thus the description thereof is omitted. In the description of FIGS. 5A to 5G, it is assumed that in the state of FIG. 5B an input is made to the B button 63 and thus the manual shot operation mode is selected.

Figure 5C:
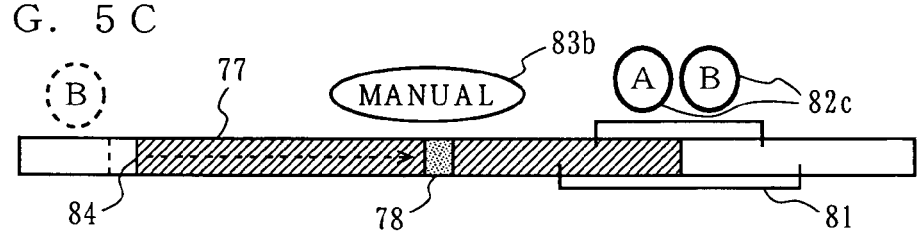

FIG. 5C is an illustration showing a display of the gauge 77, etc. for a manual shot operation upon completion of the second input. FIG. 5C is an illustration showing the case where the B button 63 is pressed for the second input. If a second input is performed while the cursor 78 is moving in the left direction, the cursor 78 reverses at the time of the second input and starts moving back in the right direction. If the second input is not performed before the cursor 78 reaches the left end of the gauge 77, the cursor 78 reverses at the left end of the gauge 77 and starts moving back in the right direction. If the second input is performed after the cursor reverses at the left end of the gauge 77, the cursor 78 keeps moving back in the right direction. If the second input is not performed even after the cursor keeps moving in the direction and reaches the reference position, the shot operation is redone, as is the case with the auto shot operation shown in FIGS. 4A to 4D.

FIG. 5C illustrates an example where if the second input is performed while the cursor 78 is moving in the left direction, the cursor 78 reverses and moves back upon the second input. However, in another example, the cursor 78 may move all the way to the left end of the gauge 77, regardless of whether a second input is performed or not, and then reverses and starts moving back to the right.

At the upper side of the gauge 77 is displayed in response to the second input, a button object 82*c* which represents the A button 62 and the B button 63 of the controller 6. The display of the button object 82*c* means that either the A button 62 or the B button 63 should be pressed for the third input, and prompts the player to perform an input to the A button 62 or the B button 63 for determining the hit location. By the button object 82*c*, the player can specifically know which control switch should be inputted next. The button object 82*c* is displayed, as in the case of the button object 82 shown in FIG. 4C, such that a display representing the A button 62 and a display representing the B button 63 are emphatically displayed in turn. In addition, as in the case of the shot operation selection object 83 in FIG. 4C, a shot operation selection object 83*b*, which displays "MANUAL", is displayed at the upper side of the gauge 77, as shown in FIG. 5C. The shot operation selection object 83*b* indicates that the manual shot operation mode has been selected by the second input. Thereby, the player is able to know which type of shot operation the player has selected. In FIG. 5C too, as in the case of FIG. 4C, the line 84, which indicates the first position, continues to be displayed even after the second input has been performed. The button object shown by the dotted line in FIG. 5C is not displayed in practice.

In the state of FIG. 5C, by stopping the cursor 78 moving in the right direction, the hit location is determined and thus the shot operation completes. In manual shot operation, by performing the third input, the second position, i.e., the stop position of the cursor 78, is determined. The player performs the third input in such a manner that the cursor 78 stops at the meet point 79 or at least within the meet area 81, so as to minimize deviation of the shot. That is, the meet area 81 and the meet point 79 are the references for hitting a ball substantially accurately. Specifically, if the second position is determined outside the meet area 81, a miss shot, such as a duff shot, results. In the present embodiment, the game machine 3 receives, as the third input, an input from the A button 62 or the B button 63. For the method of adjusting the hit location according to the relationship between the second position and the reference position, the same as that for the auto shot operation is employed.

As described above, in manual shot operation, because the player him/herself can specifically determine the hit location, it becomes possible for the player to perform a more accurate shot operation compared to the case of the auto shot operation. For example, for players who enjoy performing a precise shot operation for the joy of the game or advanced players who are familiar with shot operation, it may be appropriate to select the manual shot operation. In playing a difficult course, at times when a severe shot is demanded, the player may want to select the manual shot operation.

In the present embodiment, the game machine 3 further receives a fourth input, after the third input has been performed in the manual shot operation. As the fourth input, an input to either the A button 62 or the B button 63 is received. The game machine 3, which has received the third and fourth inputs, changes the spin direction and spin strength of the ball according to an input pattern presented by such inputs to the A button 62 and the B button 63. The spin direction and spin strength of the ball are parameters that affect a run (rolling of the ball) after the shot ball lands, in the process of displaying a scene in which the ball is traveling. The spin direction and spin strength of the ball are determined according to the above input pattern, as well as the above-described type of club and hit location.

In the present embodiment, the spin direction to be provided by the input pattern presented by the A button 62 and the B button 63 is either a backspin or topspin direction. The player can put backspin or topspin on the ball by the input pattern presented by the A button 62 and the B button 63. It is to be noted, however, that the fourth input is an operation only to put spin on the shot ball, and thus is not necessarily required to be performed. A detailed description of the spin direction and spin strength that change according to the input pattern presented by the A button 62 and the B button 63 is provided later. In another embodiment, the spin direction to be provided by the input pattern presented by the A button 62 and the B button 63 may be not limited to the backspin and topspin directions; the spin direction can be any direction. In addition, the spin direction is made to be either of two directions, backspin and topspin directions, but may be set so as to put spin on the ball in three or more directions. In such a case, for example, as the third and fourth inputs, in addition to the input to the A button 62 and the B button 63, inputs to other control switches may be made to be received.

Figure 5D:
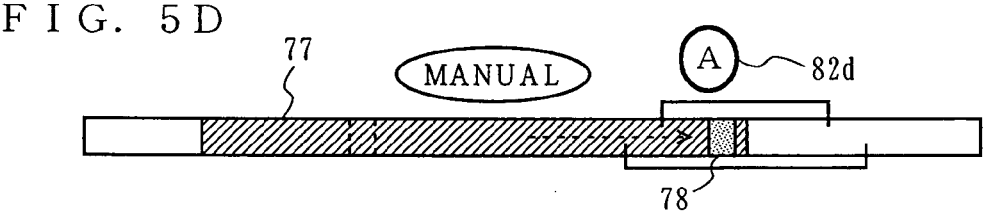
Figure 5E:
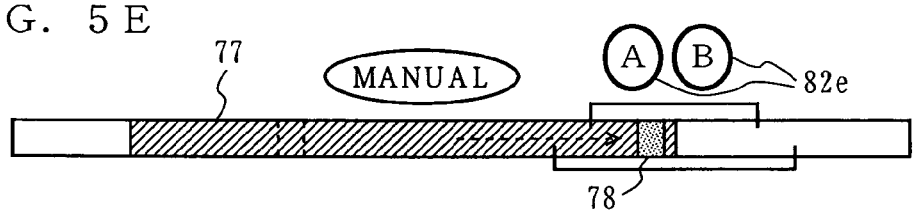
Figure 5F:
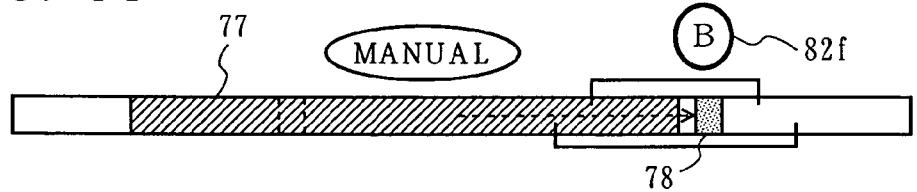
Figure 5G:
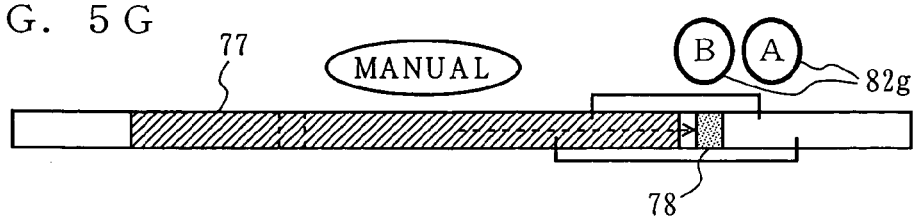

An input pattern presented by the third and fourth inputs is displayed by a button object at the upper side of the gauge 77. FIGS. 5D to 5G are illustrations showing a first exemplary display of the gauge 77, etc. upon completion of manual shot operation. In FIG. 5D, as the input pattern, a button object 82d is displayed, which indicates that the A button 62 has been inputted for the third input. In FIG. 5E, as the input pattern, a button object 82e is displayed, which indicates that the A button 62 has been inputted for the third input and the B button 63 has been inputted for the fourth input. In FIG. 5F, as the input pattern, a button object 82f is displayed, which indicates that the B button 63 has been inputted for the third input. In FIG. 5G, as the input pattern, a button object 82g is displayed, which indicates that the B button 63 has been inputted for the third input and the A button 62 has been inputted for the fourth input. Thus, by the display of the button object which indicates the input pattern, the player can visually clearly see the input performed by the player. This display allows the player to know whether the operation performed by the player is the player's desired operation or a miss operation.

As is described above, in manual shot operation, the player can specifically determine the hit location by the third input and further can hit the ball with backspin or topspin by the fourth input. As can be seen, since the spin direction of the ball can be determined by a simple operation in a series of shot operation, it becomes possible for the player to hit a shot like a top pro golf player; for example, a shot in which the ball once landed on the green rolls back towards the shooter due to backspin, and a shot with good spin due to topspin.

Next, game processing that is performed by the game machine 3 is described with reference to FIGS. 6 to 10. When the game machine 3 is turned on, the CPU 31 of the game machine 3 executes the start program stored in a boot ROM, which is not shown in the figures, whereby each unit, such as the work memory 32, is initialized. Subsequently, a golf game program stored on the optical disk 4 is read into the work memory 32 through the optical disk drive 37, thereby starting the execution of the golf game program. Then, a game space is displayed on the TV 2 via the GPU 36 and thus the game starts. After the game starts, the player selects a course to play and a player character to control, as the player views the game image displayed on the TV 2. These selections can be made by the player operating the control switches provided on the controller 6. Then, a game image based on the course and character selected by the player is displayed on the TV 2 (see FIGS. 3A and 3B). The flowchart shown in FIG. 6 illustrates processing to be performed subsequent to the above-described processing operations.

Figure 6:
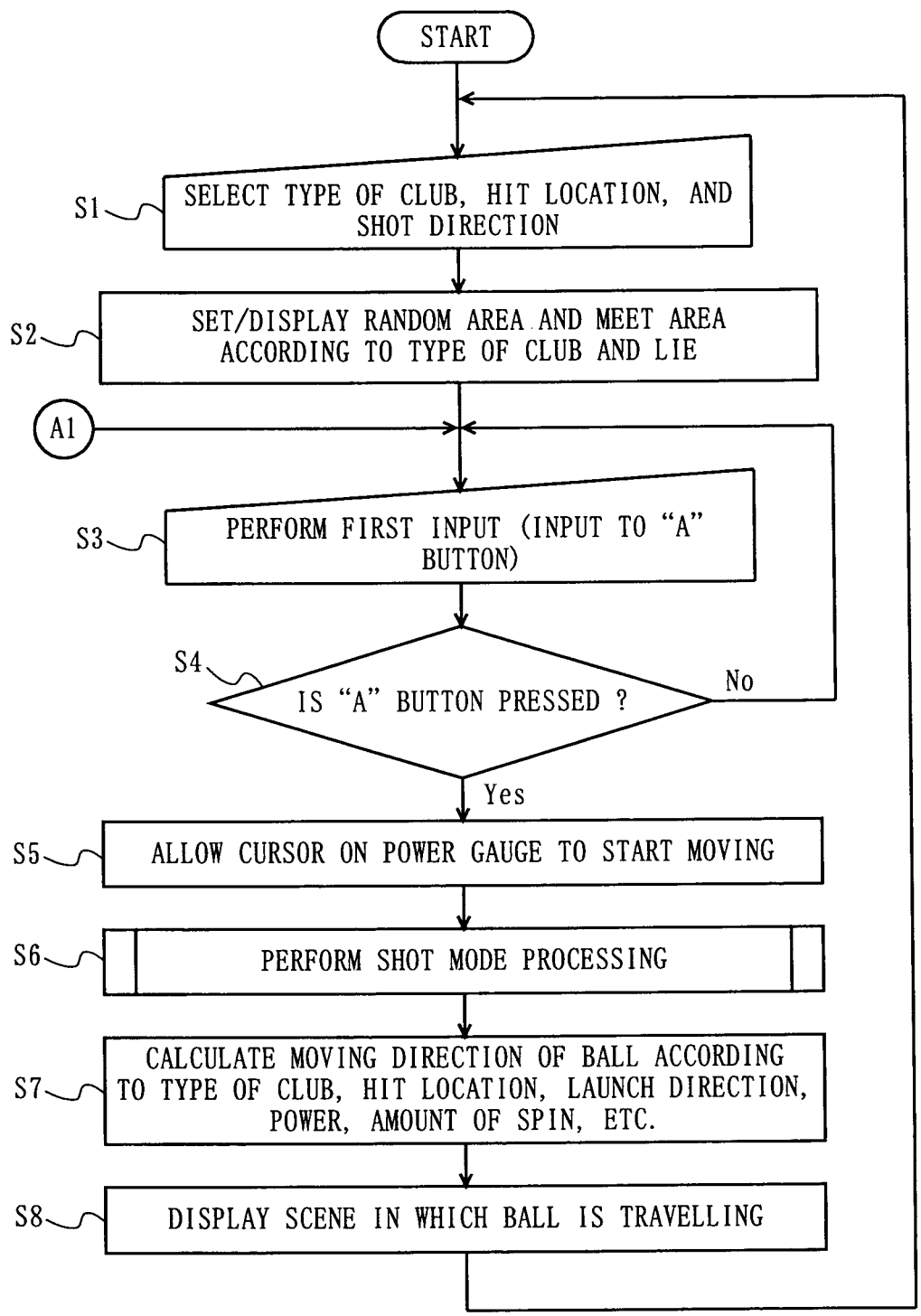
FIG. 6 is a main flowchart showing game processing performed by the game machine 3.

FIG. 6 is a main flowchart showing game processing performed by the game machine 3. First, at step S1, the player selects parameters which are set before performing a shot operation, i.e., the type of club, a desired hit location, and a shot direction. These selections are made by the player viewing the game image displayed on the TV 2 and operating given control switches of the controller 6. Specifically, the player determines the type of club by operating the main stick 61 in the upward or downward direction. The shot direction is determined by operating the main stick 61 in the left or right direction. In addition, the desired hit location is determined by operating the cross key 67 upward, downward, leftward, or rightward.

Next, at step S2, the CPU 31 sets the ranges (widths) of the random area 80 and the meet area 81 according to the type of club and ball lie, and then displays the random area and the meet area as a game image on the TV 2. The ranges of the random area 80 and the meet area 81 are determined using tables, shown in FIGS. 7A and 7B. The tables are stored on the optical disk 4 along with the game program, and are read from the work memory 32 at game start.

FIGS. 7A and 7B are drawings showing examples of the tables used for determining the ranges of the random area 80 and the meet area 81. FIG. 7A is a basic area table 85 showing the relationship between the club and the random area 80 and the meet area 81. The basic area table 85 shows correspondence of the type of club (club A, club B, . . . ) with the basic meet area (meet area A, meet area B, . . . ) and the basic random area (random area A, random area B, . . . ). The basic meet area indicates the width of the range of the meet area which is determined by the type of club, and is associated with a value indicating the width for each type of club (in FIGS. 7A and 7B, the value is expressed as "MEET AREA A", etc.). Similarly, the basic random area indicates the width of the range of the random area which is determined by the type of club, and is associated with a value indicating the width for each type of club. At step S2, first, by referring to the basic area table 85, the basic random area and basic meet area that correspond to the type of club determined at step S1, are calculated.

FIG. 7B shows a lie coefficient table 86 showing association of a lie with a lie coefficient. The lie coefficient is a value that is expressed as a percentage. In the lie coefficient table 86, values (100%, 60%, etc.) are set, which indicate lie coefficients for each type of lie (FAIRWAY A, ROUGH A, etc.). The values are set such that the worse the lie condition, the lower the value of the lie coefficient. At step S2, the current lie condition is detected, and by referring to the lie coefficient table 86 the lie coefficient is calculated. It is to be noted that the type of lie is preset for all points of the golf course, and thus based on a point where the ball is currently situated, the type of lie at such a point can be derived.

According to the basic random area, basic meet area, and lie coefficient which are calculated in the manner described above, the final random area 80 and meet area 81, which are set at step S2, are determined. Specifically, by dividing the basic random area by the lie coefficient, the final random area 80 is determined. For the random area 80, by thus dividing the random area 80 by the lie coefficient, the random area 80 is set such that the worse the lie condition the wider the range, and the better the lie condition the narrower the range. Accordingly, in auto shot operation, the worse the lie condition, the higher the possibility that a shot is made at a hit location deviated from the ideal point. By multiplying the basic meet area by the lie coefficient, the final meet area 81 is determined. For the meet area 81, by thus multiplying the meet area 81 by the lie coefficient, the meet area 81 is set such that the worse the lie condition the narrower the range, and the better the lie condition the wider the range. Accordingly, in manual shot operation, the worse the lie condition, the higher the possibility of a miss shot. In FIGS. 3A, 3B, 4A to 4D, and 5A to 5G, the random area 80 is set narrower than the meet area 81, but depending on the type of club and lie conditions, the random area 80 may be set wider than the meet area 81.

As is described above, in the present embodiment, the ranges of the random area 80 and the meet area 81 change in response to the type of club or lie. In another embodiment, the configuration is not limited to that described above; the ranges of the random area 80 and the meet area 81 may change in response to, for example, player characters. Specifically, by preparing a set of the basic area table 85 and the lie coefficient table 86 for each player character, the ranges of the random area 80 and the meet area 81 can change in response to the player characters. In still another embodiment, the configuration may be such that in the case of playing the game with a plurality of player characters at a time, the ranges of the random area 80 and the meet area 81 change in response to the score or rank.

In the present embodiment, the ranges of the random area 80 and the meet area 81 change in response to the type of club and then are displayed, and therefore the player can determine the appropriate club for a given condition (lie). Specifically, in selecting a type of club, if a display is such that the wide random area 80 is wide and the meet area 81 is narrow, the player can see that the selected type of club is not appropriate; on the other hand, if a display is such that the random area 80 is narrow and the meet area 81 is wide, the player can see that the selected type of club is appropriate.

In the present embodiment, the player may determine, based on the display of the random area 80 and the meet area 81, which one of the manual shot operation mode and auto shot operation mode to select. For example, if a display is such that the random area 80 is wider than the meet area 81, selecting the auto shot operation mode gives more possibility of a miss shot, and thus the player can see that the manual shot operation should be selected; on the other hand, if a display is such that the random area 80 is narrower than the meet area 81, even if selecting the auto shot operation mode, a miss shot cannot be made and thus the player can see that the auto shot operation mode should be selected. As described above, displaying the random area 80 and the meet area 81 provides to the player information for determining which operation mode to select. Accordingly, displaying the random area 80 and the meet area 81 enhances the nature of the game of the golf game which allows the player to select the manual shot operation or the auto shot operation mode.

Back to the description of FIG. 6, upon completion of step S2, the CPU 31 waits for the player to perform the first input for starting a shot operation. That is, the CPU 31 at step S3 receives the first input (i.e., an input to the A button 62 of the controller 6), and at the subsequent step S4 determines whether the first input has been performed. If, according to the determination, the first input has not been performed, processing returns to steps S3 and S4, and the CPU 31 again waits for an input to the A button 62. If the first input has been performed, processing advances to step S5.

Next, at step S5, the cursor 78 on the gauge 77 starts moving and the shot operation starts (see FIGS. 4A and 5A). At the subsequent step S6, shot mode processing is performed. The shot mode processing is processing for determining the shot power, hit location, etc. by the shot operation performed by the player. The shot mode processing is described in detail below, with reference to FIGS. 8 to 10.

Figure 8:
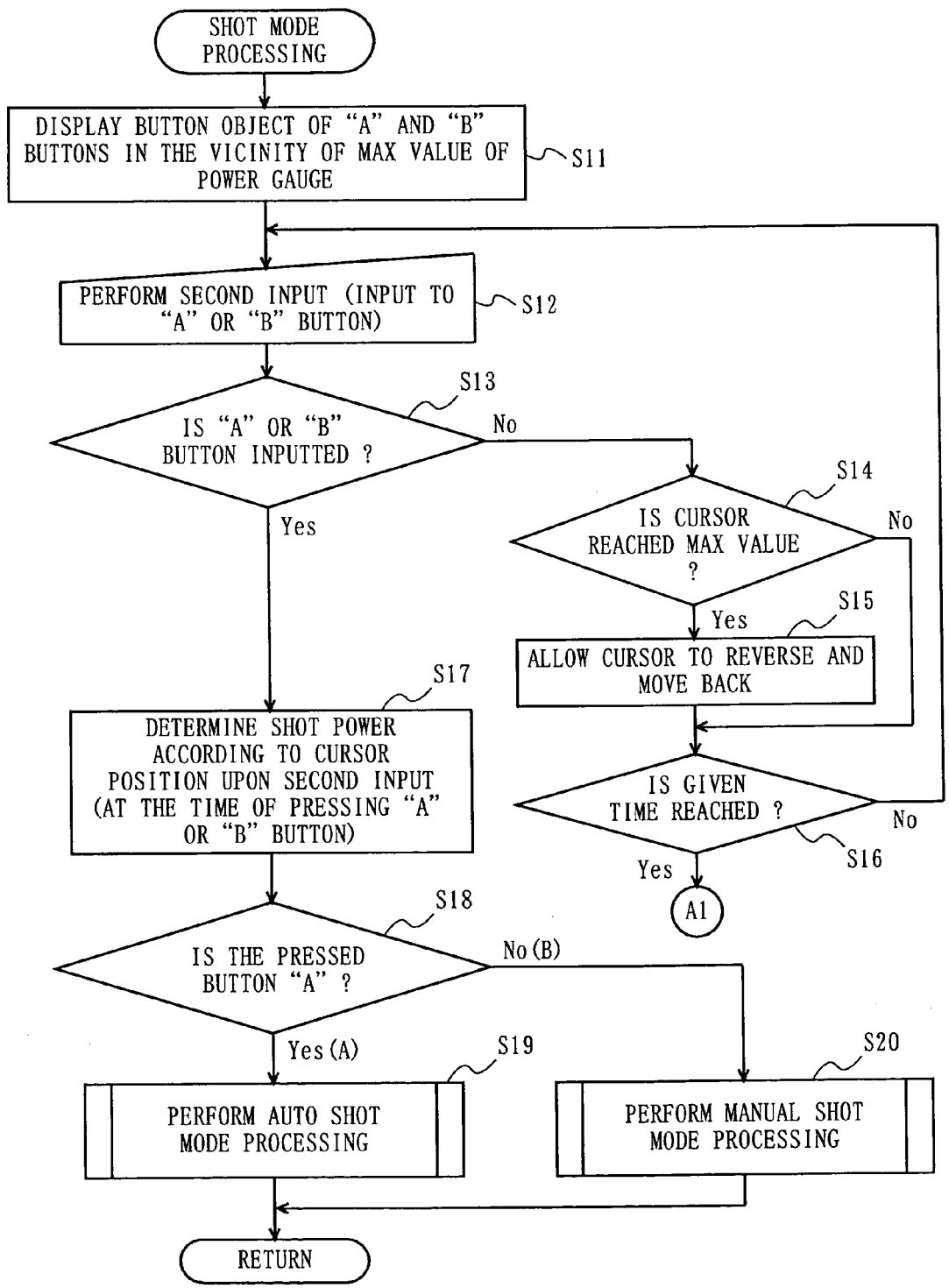
FIG. 8 is a flowchart showing the detail of step S6 in FIG. 6.

FIG. 8 is a flowchart showing the detail of step S6 in FIG. 6. First, at step S11, the button object 82b, which represents the A button 62 and the B button 63, is displayed in the vicinity of the maximum value of the gauge 77 (see FIGS. 4B and 5B). The maximum value of the gauge 77 indicates the position at which the shot power is at the maximum in the gauge 77, i.e., the left end of the gauge 77.

Upon completion of step S11, the CPU 31 waits for the player to perform the second input for determining the shot power. That is, the CPU 31 at step S12 receives the second input (i.e., an input to the A button 62 or the B button 63 of the controller 6), and at the subsequent step S13 determines whether the second input has been performed. If, according to the determination of step S13, the second input has been performed, the process of step S17 is performed. If, according to the determination of step S13, the second input has not been performed, the process of step S14 is performed. Specifically, at step S14, whether or not the cursor 78 has reached the maximum value (left end) of the gauge 77 is determined. If, according to the determination of step S14, the cursor 78 has reached the maximum value of the gauge 77, at step S15 the cursor 78 reverses and starts moving back in the right direction. Thus, if the second input has not been performed before the cursor 78, which has started moving in the left direction from the reference position, reaches the left end of the gauge 77, the cursor 78 reverses at the left end of the gauge 77 and starts moving back to the right. If, according to the determination of step S14, the cursor 78 has not reached the maximum value of the gauge 77, the process of step S15 is skipped and processing advances to step S16.

At step S16, whether or not a predetermined time is reached is determined. The predetermined time is the time from when the cursor 78 starts moving to when the cursor 78 reaches again the reference position. Specifically, the predetermined time is the time required for the cursor 78, which starts moving in the left direction from the reference position at the start of the shot operation (step S5), to reverse at the left end of the gauge (step S15) and then return again to the reference position. If, according to the determination of step S16, the predetermined time is not reached, processing returns to steps S12 and S13, and the CPU 31 waits again for the second input. If, according to the determination of step S16, the predetermined time is reached, processing returns to step S3, and the first input is received. That is, if the second input is not performed within the predetermined time, the shot operation is cancelled and restarts from the first step thereof. In another embodiment, the configuration may be such that if, according to the determination of step S16, the predetermined time is reached, processing returns to step S1 instead of returning to step S3 and restarts from selection of the type of club, etc.

Next, at step S17, the first position of the cursor 78 is determined. That is, the shot power is determined in response to the position of the cursor 78 on the gauge 77 at the time of the second input. Specifically, the shot power is determined according to the length from the reference position to the first position on the gauge 77. In other words, the shot power is determined according to the elapsed time from the time of performing the first input (step S3) to the time of performing the second input (step S12).

Then, at step S18, whether or not the second input, which is received at step S12, is made to the A button 62 is determined. If the determination is positive, that is, if at step S12 the A button 62 is pressed, auto shot mode processing of step S19 is performed. The auto shot mode processing is processing for the case where the auto shot operation mode is selected. If, the determination of step S18 is negative, that is, if at step S12 the B button 63 is pressed, manual shot mode processing of step S20 is performed. The manual shot mode processing is processing for the case where the manual shot operation mode is selected. As is described above, in the present embodiment, whether the manual shot operation mode or the auto shot operation mode is performed is determined by the input in the shot operation (the second input at step S12) in the process of shot operation (step S18). Therefore, the player can perform a setting operation for determining which operation to perform, without the need to perform an additional process to shot operation.

Figure 9:
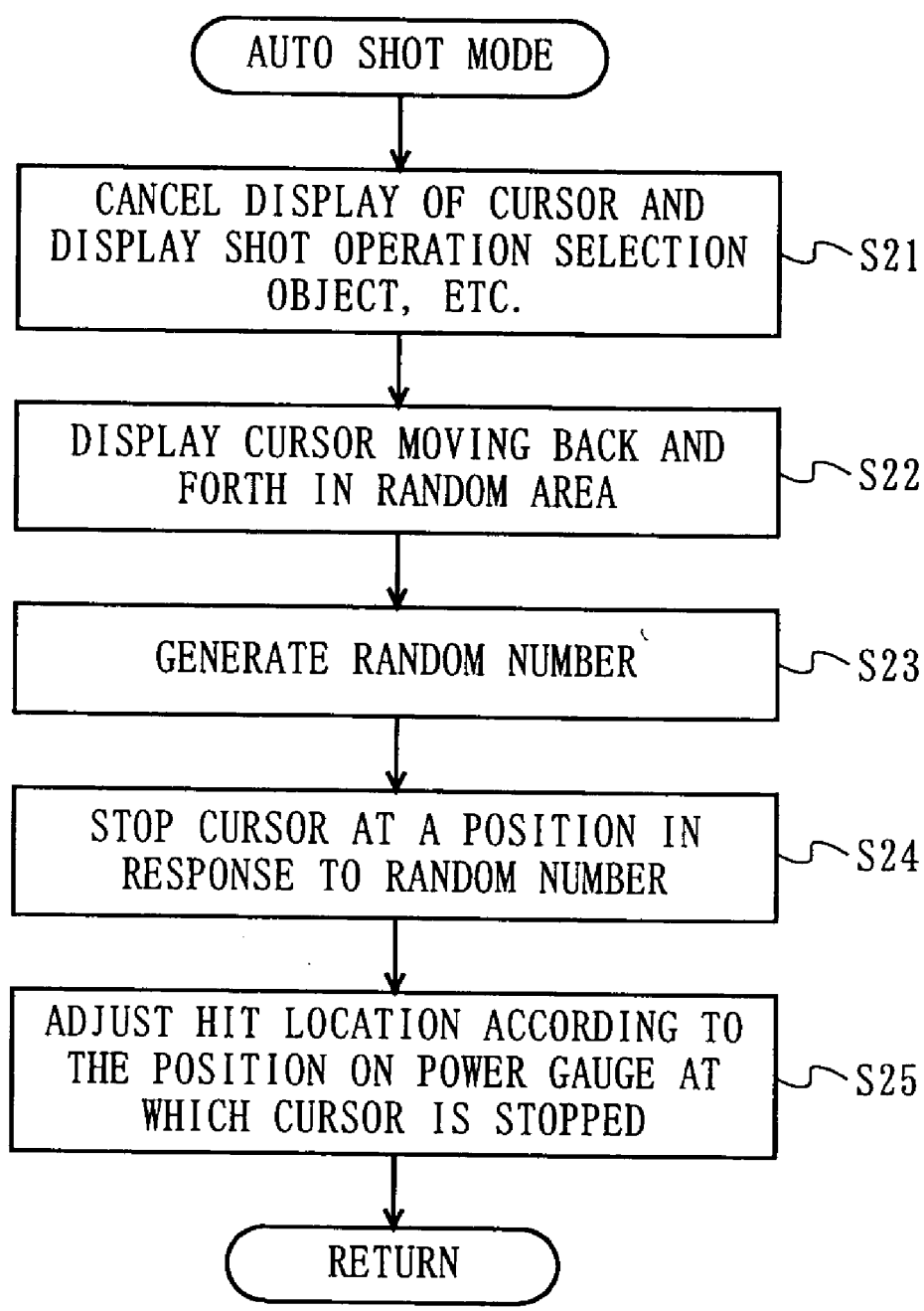
FIG. 9 is a flowchart showing the detail of step S19 in FIG. 8.

FIG. 9 is a flowchart showing the detail of step S19 in FIG. 8. First, at step S21, the CPU 31 cancels the display of the cursor 78 being moved and displays the shot operation selection object 83a which indicates the auto shot operation (see FIG. 4C). Here, the line 84, which indicates the position at which the cursor 78 is stopped, i.e., the first position, is displayed on the gauge 77 (see FIG. 4C). At the subsequent step S22, the cursor 78 is displayed inside the random area 80, and moves back and forth between the both ends of the random area 80 (see FIG. 4C).

Next, the CPU 31 at step S23 generates a random number, and at step S24 stops the cursor 78 at a position based on the random number. Specifically, values that can be obtained by random numbers are associated with positions in the random area 80 of the gauge 77, and the cursor 78 is stopped at a position corresponding to a generated random number. Thus, the stop position of the cursor 78, i.e., the second position, is determined. Further, at step S25, the hit location is adjusted in response to the second position. Specifically, the player's desired hit location, which is specified at step S1, is adjusted according to the deviation between the reference position and the second position. More specifically, the further the second position deviates to the right side from the reference position, the further the hit location determined at step S25 lies to the right side of the player's desired hit location. Conversely, the further the second position deviates to the left side from the reference position, the further the hit location determined at step S25 lies to the left of the player's desired hit location. That is, the greater the deviation between the reference position and the second position, the further it is from the player's ideal shot. By the above-described steps S21 to S25, the auto shot mode processing completes. Further, upon completion of the auto shot mode processing, the shot mode processing completes.

Figure 10:
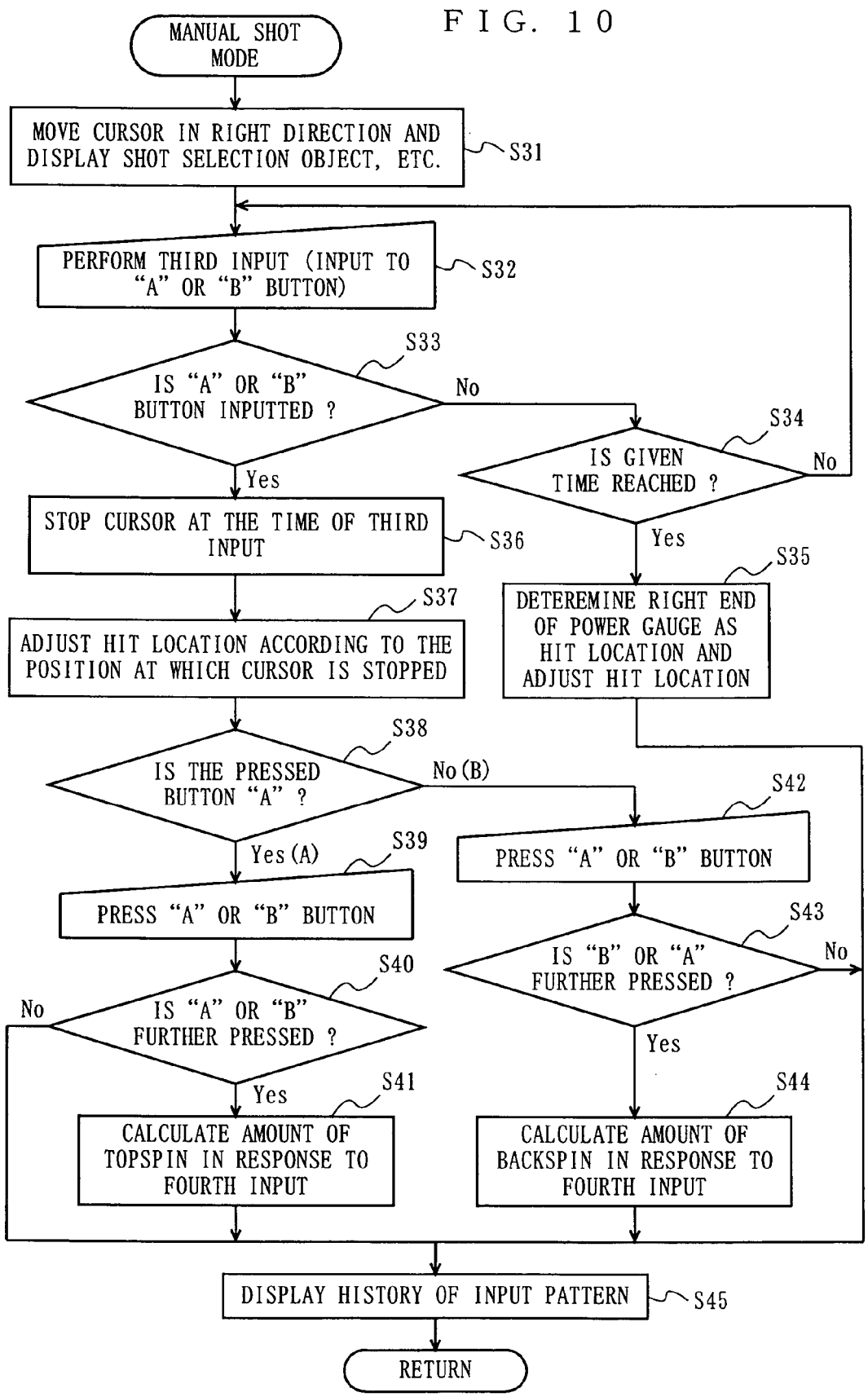
FIG. 10 is a flowchart showing the detail of step S20 in FIG. 8.
Figure 11A:
FIGS. 11A to 11C are illustrations showing exemplary displays of a gauge used in shot operation in a conventional golf game.
Figure 11B:
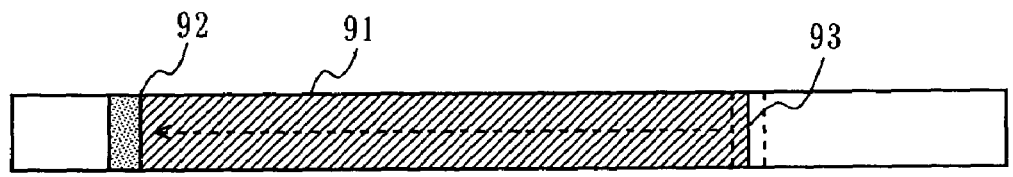
Figure 11C:
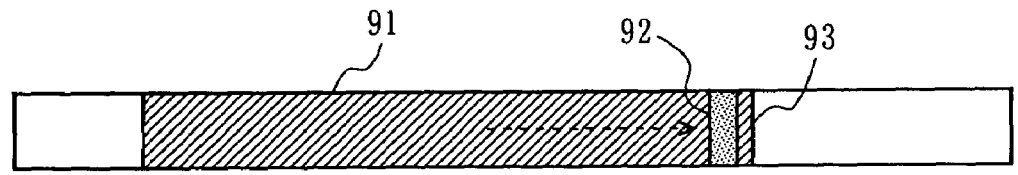

FIG. 10 is a flowchart showing the detail of step S20 in FIG. 8. First, at step S31, the CPU 31 moves the cursor 78 being moved in the right direction (see FIG. 5C). At the point of step S31, there are two cases; one is that the cursor 78 is moving in the left direction (the case where the second input is performed before the cursor 78 reaches the left end of the gauge 77), and the other is that the cursor 78 is moving in the right direction (the case where the second input is performed after the cursor 78 reaches the left end of the gauge 77). At step S31, in either case, the cursor 78 is allowed to move in the right direction, i.e., in the direction towards the reference position. In addition, at step S31, the shot operation selection object 83b, which indicates the manual shot operation, and the button object 82c, which represents the A button 62 and the B button 63, are displayed at the upper side of the gauge 77 (see FIG. 5C).

Upon completion of step S31, the CPU 31 waits for the player to perform the third input for determining the hit location. That is, the CPU 31 at step S32 receives the third input (i.e., an input to the A button 62 or the B button 63 of the controller 6), and at step S33 determines whether the third input has been performed. If, according to the determination of step S33, the third input has been performed, the process of step S36 is performed. If, according to the determination of step S33, the third input has not been performed, the process of step S34 is performed.

At step S34, the CPU 31 determines whether a predetermined time is reached. The predetermined time is the time from when the first position of the cursor 78 is determined (step S17) to when the cursor 78 reaches the right end of the gauge 77. If, according to the determination of step S34, the predetermined time is not reached, processing returns to steps S32 and S33, and the CPU 31 waits again for the third input. If, according to the determination of step S34, the predetermined time is reached, the process of step S35 is performed. That is, at step S35, the right end of the gauge 77 is determined as the second position, and according to the second position the hit location is adjusted. In other words, at step S35, the movement of the cursor 78 is stopped at the right end of the gauge 77, and according to the position at which the cursor is stopped the hit location is adjusted. Thus, the player is required to perform the third input for determining the hit location, within a predetermined time from the second input for determining the shot power. If the player does not perform the third input within the predetermined time, the hit location is adjusted according to the position at the right end of the gauge 77. Consequently, the final hit location is determined at a position greatly deviated from the player's desired hit location. Upon completion of step S35, processing advances to step S45.

If the third input is performed before the predetermined time is reached, at step S36 the second position of the cursor 78 is determined by the third input. That is, at the time of the third input, movement of the cursor 78 is stopped. Further, at step S37, the hit location is adjusted according to the position at which the cursor 78 is stopped on the gauge 77, i.e., the second position. The adjustment of the hit location is made in the same manner as that of the above-described step S25.

In the manual shot mode processing, after the hit location is determined at step S37, the processes of adjusting the spin direction and spin strength (amount of spin) of the ball are performed (steps S38 to S44).

Before describing the processes of steps S38 to S44, the relationship between the input pattern presented by the third and fourth inputs and the spin direction and spin strength of the ball is described. In the present embodiment, the spin direction is determined in response to the type of control switches pressed for the third input. Specifically, if the third input is made to the A button, the spin direction is determined to the topspin direction. If the third input is made to the B button, the spin direction is determined to be in the backspin direction. Further, depending on whether the type of control switches pressed for the fourth input is the same as that for the third input, the spin strength is determined. Specifically, if the type of control switches pressed for the fourth input is the same as that for the third input, the spin strength is determined to a relatively large value. If the type of control switches pressed for the fourth input is different from that for the third input, the spin strength is determined to a relatively small value. The spin direction and spin strength thus determined are added to the spin direction and spin strength calculated according to other parameters (the type of club and hit location). In the absence of the fourth input, the spin strength is not adjusted. In other words, the spin strength is determined only by the other parameters (the type of club and hit location). The processes of steps S38 to S44 are described in detail below.

First, at step S38, whether the third input received at step S32 is made to the A button 62 is determined. If the determination at step S38 is positive, that is, if the A button 62 was pressed at step S32, the processes of steps S39 to S41 are performed. At steps S39 to S41, processing for determining the spin strength of topspin direction is performed. If the determination at step S38 is negative, that is, if the B button 63 is pressed at step S32, the processes of steps S42 to S44 are performed. At steps S42 to S44, processing for determining the spin strength of backspin direction is performed.

If the determination at step S38 is positive, at step S39 the fourth input (i.e., an input to the A button 62 or the B button 63 of the controller 6) is received. At step S39, the CPU 31 receives the fourth input for a predetermined time. When the predetermined time is reached, regardless of whether the fourth input is performed or not, the CPU 31 performs the process of step S40. At step S40, whether or not the fourth input is performed, that is, whether either the A button 62 or the B button 63 is pressed, is determined. If, according to the determination of step S40, the fourth input is determined to be absent, the process of step S41 is skipped, and processing advances to step S45. In this case, the amount of spin is not added.

If, according to the determination of step S40, the fourth input is determined to be present, the process of step S41 is performed. At step S41, the amount of topspin direction to be added is determined according to the type of control switches (either the A button 62 or the B button 63) inputted as the fourth input. Specifically, if the fourth input is made to the A button 62, a greater amount of spin is added than the case where the fourth input is made to the B button 63. That is, if the third input is made by the A button 62 and the fourth input is made by the A button 62, strong topspin is put on the ball. If the third input is made by the A button 62 and the fourth input is made by the B button 63, weak topspin is put on the ball. As described above, at step S41, the amount of spin on the ball varies with the type of control switches inputted as the fourth input. Upon completion of step S41, processing advances to step S45.

At step S42, the fourth input (i.e., an input to the A button 62 or the B button 63 of the controller 6) is received. The process of step S42 is the same as that of the above-described step S39. Therefore, if the predetermined time is reached, as is in step S39, regardless of whether the fourth input is performed or not, the process of step S43 is performed. The process of step S43 is the same as that of step S40. Thus, if, according to the determination of step S43, the fourth input is determined to be absent, the process of step S44 is skipped, and processing advances to step S45.

If, according to the determination of step S43, the fourth input is determined to be present, the process of step S44 is performed. At step S44, the amount of backspin direction to be added is determined according to the type of control switches inputted as the fourth input (either the A button 62 or the B button 63). Specifically, if the fourth input is made to the B button 63, a greater amount of spin is added than the case where the fourth input is made to the A button 62. That is, if the third input is made by the B button 63 and the fourth input is made by the B button 63, strong backspin is put on the ball. If the third input is made by the B button 63 and the fourth input is made by the A button 62, weak backspin is put on the ball. As described above, at step S44, as is in step S41, the amount of spin on the ball varies with the type of control switches inputted as the fourth input. Upon completion of step S44, processing advances to step S45.

At step S45, the history of the input pattern presented by the third and fourth inputs is displayed (see FIGS. 5D to 5G). That is, by the process of step S45, button objects, which represent control switches received at steps S32, S39, and S42, are displayed at the upper side of the gauge. For example, if the third input is made to the B button 63 and the fourth input is made to the A button 62, the button object 82*g*, shown in FIG. 5G, is displayed. If the process of step S35 is performed and the hit location is determined by the CPU 31, no button object is displayed. By the process of step S45, the player can visually confirm the input made by the player him/herself. Accordingly, the player is able to see if the shot operation is performed properly, and is able to see if the control switches are misoperated. Upon completion of step S45, the manual shot mode processing completes, and further by the completion of the manual shot mode processing the shot mode processing completes. By the above-described shot mode processing, the shot power and hit location are determined.

Back to the description of FIG. 6, upon completion of the shot mode processing, the CPU 31 at step S7 calculates the moving direction of the shot ball (the travel path of the ball and the run after the landing of the ball). The moving direction of the ball is calculated according to parameters, such as the type of club, shot direction determined at step S1, and shot power, hit location, spin direction, and spin strength determined at step S6. Parameters for expressing the moving direction of the ball include, for example, the travel direction of the ball (the left or right direction), angle at which the ball travels (the upper or downward direction), amount of curve, carry, spin direction, and spin strength, and are determined as follows. Specifically, the travel direction of the ball is determined by the hit location and shot direction. The angle at which the ball travels is determined by the type of club (because the shaft angle varies with the type of club) and hit location. The amount of curve is determined by the type of club, hit location, spin direction, and spin strength. The carry is determined by the shot power. The spin direction and spin strength of the ball are determined at step S6 (see steps S41 and S44). For determination of the moving direction of the ball, in addition to the above parameters, parameters, such as wind, landform of the point where the ball lands, and weather, may be used.

Next, at step S8, according to the calculation results of step S7, an image is displayed on the TV 2, which shows a scene in which the shot ball is traveling. Upon completion of step S8, processing returns to step Si. The above-described processes of steps S1 to S8 are performed per one shot, and by repeating the processes of steps S1 to S8 the golf game proceeds.

As described above, according to the present embodiment, the player can select either of the two types of shot operation, the manual or auto shot operation; therefore players with a variety of skills, from beginner to advanced, can enjoy the golf game. Furthermore, because the selection between the two types of shot operation is made during the shot operation, the player can enjoy the golf game without the need to perform, before the shot operation, a troublesome operation for selecting shot operation.

Moreover, according to the present embodiment, since in auto shot operation the hit location is determined randomly within the random area, the game does not get extremely easy by the auto shot operation. Therefore, a golf game machine can be provided, which provides an easy shot operation and does not impair the nature of the game of the golf game.

In the above description, the selection between the manual and auto shot operations is made by the second input. In another embodiment, for example, the configuration may be such that if an input is made to the A button as the first input, the manual shot operation is selected and if an input is made to the B button as the first input, the auto shot operation is selected (in this example, the second input has nothing to do with the selection between the manual and auto shot operations). In addition, for example, the configuration may be such that if an input is made to the A button as the first input and an input is made to the B button as the second input, or if an input is made to the B button as the first input and an input is made to the A button as the second input, the auto shot operation is selected. As described above, any configuration can be employed as long as the selection between the manual and auto shot operations is made according to the input pattern presented by the first and second inputs.

In the above description, each of the first to fourth inputs for shot operation responds to one-time input to the control switch (i.e., the control switch is pressed one time). However, it is also possible to allow each of the first to fourth inputs to respond to a plurality of inputs. That is, for each of the first to fourth inputs, a plurality of inputs may be taken as one-time input. For example, two consecutive inputs to the A button may be taken as the first input.

In the above description, the gauge 77 of bar shape is used as an example, but the gauge can be any shape. For example, the gauge may be a circular band shape.

In the above description, as an example of the game in which an object (a golf ball in the above example) is moved (shot in the above example), a golf game is used to describe a game machine of the present invention; however, the game may be of other types. A game machine of the present invention can be applied to various types of games in which the operation of moving an object is performed, such as the cast operation of casting a bait in a fishing game and the operation of kicking a ball in a football game.

Furthermore, in the above description, a stationary game machine is provided to the game system, but game machines to which the present invention can be applied are not limited to the stationary game machine. For example, the present invention can be applied even to a portable game machine, using a plurality of input portions provided to the game machine, and can also be applied even to a general computer system provided with a display portion.

While the invention has been described in detail, the foregoing description is in all aspects illustrative and not restrictive. It is understood that numerous other modifications and variations can be devised without departing from the scope of the invention.

What is claimed is:

1. A golf game machine having a dynamic shot mode selection mechanism which displays on a display device a gauge and a cursor moving on the gauge along with a scene in which a ball hit by a player character travels in a game field according to a shot power and a hit location indicated by the cursor on the gauge, and wherein different shot operation selection inputs are performed by a player during a golf game club swing operation, the golf game machine dynamic shot mode selection mechanism comprising:

at least one controller having a plurality of control switches for providing a sequence of inputs to said game machine including at least a first input, a second input and a third input, wherein movement of the cursor along the gauge is initiated by the first input from the controller, the shot power is set in relation to a first detected position of the moving cursor at a time producing the second input from the controller, and the hit location is set in relation to a position of the cursor at which movement of the cursor is stopped;

start cursor movement process programmed logic circuitry configured to receive said first input from the controller and start the cursor moving along the gauge in response to said first input;

input processing programmed logic circuitry configured to receive, as said second input from the controller, an input by a first control switch among the plurality of control switches or an input by a second control switch among the plurality of control switches; and cursor position processing programmed logic circuitry configured to determine, as a cursor first detected position for setting the shot power, a position of a moving cursor at a time of receiving the second input from the controller when said second input is produced from said first control switch said controller, and then determining a subsequent position of the same moving cursor at a time of receiving the third input from the controller as a hit location position on the gauge at which movement of the cursor is stopped; and said cursor position detecting programmed logic circuitry also being configured to determine, as a cursor first detected position for setting a shot power, a position of a moving cursor at a time of receiving said second input when said second input is produced from said second control switch of said controller, and then automatically determining a different position on the gauge as a hit location position at which movement of the cursor is stopped, wherein different first and second control switch activation patterns are recognized by the golf game machine to enable a player to dynamically select between a plurality of different shot operation modes during each club swing operation.

2. The golf game machine according to claim 1, wherein the cursor position detecting programmed logic circuitry is further configured to determine a hit location position so as to be randomly positioned every time the second input from the second control switch is received by the input processing programmed logic circuitry.

3. The golf game machine according to claim 2, further comprising range setting programmed logic circuitry configured to set a range on the gauge and changes a width of the range in response to at least one condition selected from a group of conditions comprising circumstances of the ball, a golf club selected by a player, and characteristics of the player character, wherein the cursor position determining programmed logic circuitry determines the hit location position so as to be randomly positioned within the range set by the range setting mechanism.

4. The golf game machine according to claim 3, further comprising area display programmed logic circuitry configured to display on the display device a random area and a meet area, along the gauge, the random area indicating the range set by the range setting programmed logic circuitry, and the meet area serving as an index for determining the hit location position.

5. The golf game machine according to claim 2, wherein the cursor position determining programmed logic circuitry randomly determines the hit location position according to a random number.

6. The golf game machine according to claim 1, further comprising control-switch image display programmed logic circuitry configured to display on the display device a first image and a second image after the first input is received from the controller, the first image representing the first control switch, the second image representing the second control switch.

7. The golf game machine according to claim 1, further comprising:

input processing programmed logic circuitry further configured to receive said third input from the controller as an input produced by said first control switch or said second control switch or a third control switch or a fourth control switch among the plurality of control switches of the controller;

spin direction programmed logic circuitry configured to set a spin direction, of the ball in response to the third input from the controller provided by either said first control switch or said second control switch or said third control switch or said fourth control switch, wherein the spin direction of the ball is set to a first direction when the third input is provided by one of said first through fourth control switches and is set to a second direction when the third input is provided by a different one of said first through fourth control switches; and wherein the scene in which the player character hits the ball displays a ball which travels according to the shot power, the hit location, and the spin direction.

8. The golf game machine according to claim 7, further comprising spin strength programmed logic circuitry configured to set a spin strength of the ball in response to a fourth sequential input from the controller by either said first control switch or said second control switch or said third control switch or said fourth control switch, wherein:

the spin strength is set depending upon whether or not the third input and the fourth sequential input are received from a same control switch.

9. The golf game machine according to claim 8, further comprising history image display programmed logic circuitry configured to display on the display device, a history image indicative of a history of which particular control switches provided third and fourth inputs after the second input is provided by said first control switch.

10. A golf game machine wherein hit location and shot power input operations are performed during a golf hall shot operation and which displays on a display device a gauge and a cursor that moves on the gauge, along with a scene in which a ball hit by a golf club swung by a game character travels in a game field according to a shot power and a hit location indicated by the cursor on the gauge, the golf game machine comprising:

at least one controller having a plurality of control switches for permitting a user to sequentially provide a first input, a second input and a third input to the game machine, wherein movement of the cursor along the gauge is initiated by the first input from the controller, the shot power is set in relation to a first detected position of the moving cursor at a time of providing the second input from the controller, and the hit location is set in relation to a position of the cursor at which movement of the cursor is stopped;

start cursor movement mechanism which receives said first input from the controller and initiates cursor movement along the gauge in response to said first input;

input receiving mechanism which receives said second input to the controller; and moving cursor position determining mechanism which determines, as a first detected cursor position, a position of the cursor at a time of receiving said second input from the input receiving mechanism and then determines as a second detected cursor position, a predetermined position on the gauge at which movement of the cursor is stopped.

11. The golf game machine according to claim 10, further comprising a range setting mechanism which sets a range on the gauge and changes a width of the range in response to at least one or more conditions comprising circumstances of the ball, a golf club selected by a player, or characteristics of the game character, wherein the moving cursor position determining mechanism determines the second detected cursor position so as to be randomly positioned within the range set by the range setting mechanism.

12. The golf game machine according to claim 11, further comprising an area display mechanism which displays along the gauge on the display device a random area indicator and a meet area indicator, the random area indicator indicating the range set by the range setting mechanism, and the meet area indicator serving as an index for determining the second detected cursor position.

13. The golf game machine according to claim 10, wherein the moving cursor position determining mechanism randomly determines the second detected cursor position according to a random number.

14. A golf game machine having a dynamic shot mode selection mechanism which displays on a display device a gauge and a cursor moving on the gauge along with a scene in which a ball hit by a golf club swung by a game character travels in a game field according to a shot power and a hit location indicated by the cursor on the gauge, and wherein different shot mode operation selection inputs are performed by a user during a club swing operation, the golf game machine dynamic shot mode selection mechanism comprising:

at least one controller having a plurality of control switches for providing a sequence of inputs to the game machine, wherein movement of the cursor along the gauge is initiated by a first input produced by the controller, the shot power is set in relation to a cursor first position determined at a time of producing a second input, and the hit location is set in relation to a position of the cursor at which movement of the cursor is stopped;

start cursor movement process programmed logic circuitry configured to receive a first input from the controller and start the cursor moving along the gauge in response to the first input;

cursor position processing programmed logic circuitry configured to receive a second input from the controller and determine a position on the gauge of a cursor at a time of receiving the second input for use in setting a shot power;

said cursor position detecting programmed logic circuitry also being configured to receive, after the first and second inputs from the control switches occur in a first predetermined sequence, a third input from the controller, and to determine a position of the cursor on the gauge at the time of receiving the third input as a hit location position at which movement of the cursor along the gauge is stopped; and said cursor position determining programmed logic circuitry also being configured to automatically determine, a subsequent random position on the gauge as the hit location position when the first and second inputs occur in a second predetermined sequence which is different from said first sequence, wherein different control switch activation input patterns are recognized by the golf game machine to enable a user to dynamically select between a plurality of different shot operation modes during each club swing operation.

15. A game machine having a dynamic operation mode selection mechanism which displays on a display device an image of a gauge and a cursor moving on the gauge along with a scene in which an object moves in a game field according to a movement distance of the object and a movement direction parameter of the object indicated by the gauge, and wherein a selection of different operation modes for controlling object movement are performed by player during a predetermined game operation, the game machine dynamic operation mode selection mechanism comprising:

one or more controller having a plurality of control switches for providing a sequence of inputs to said game machine including at least a first input, a second input, and a third input, wherein the movement of the cursor along the gauge is initiated by the first input from the controller, the movement distance parameter is determined based on a first detected position of the moving cursor at a time of producing the second input from the controller, and the movement direction parameter is determined based on a position of the cursor at a time of producing the third input from the controller;

start cursor movement processing mechanism which receives said first input from the controller and starts the cursor moving along the gauge in response to the first input;

input receiving mechanism which receives, as said second input to the controller, an input by a first control switch among the plurality of control switches or an input by a second control switch among the plurality of control switches, said second control switch being different from the first control switch;

cursor position determining mechanism which determines, as a cursor first detected position for determining a movement distance parameter, a position of a moving cursor at the time of receiving the second input from the controller when the second input is produced from said first control switch, and then determining a subsequent position on the gauge of the same moving cursor at a time of receiving the third input from the controller as a movement direction position; and said cursor position determining mechanism also determining, as a cursor first detected position for determining said movement distance parameter, a position of a moving cursor at the time of receiving said second input when said second input is produced from said second control switch of the controller, and then automatically determines a different position on the gauge as a movement direction position, wherein different first and second control switch activation input patterns performed by a player during a course of said predetermined game operation are recognized by the game machine to enable the player to dynamically select between a plurality of different available operation modes.

16. A storage medium having stored thereon a golf game program to be executed by a computer of a game machine, the storage medium being readable by the computer, the game machine comprising a controller device having a plurality of control switches and a display device on which is displayed a gauge and a cursor moving on the gauge along with a scene in which a ball hit by a golf club swung by a game character travels in a game field according to a shot power and a hit location indicated by a cursor position on the gauge and determined by a shot mode selection arrangement wherein golf club shot mode selection input operations may be dynamically performed during a golf ball shot operation by a player manipulating the controller device, said golf game program configuring the computer to function as:

a start cursor moving mechanism which receives a first input from a first control switch of the controller and initiates the cursor moving along the gauge at a time of receiving the first input;

an input processing mechanism which receives, as a second input from the controller for setting a shot power, an input from a first control switch among the plurality of control switches or from a second control switch among the plurality of control switches which is different from the first control switch;

a position determining mechanism which determines, when the second input is received by the input receiving mechanism from the first control switch, a position of the cursor at the time of receiving the second input to he used in setting a shot power, and then receives a third input to the controller and determines a position of the cursor at the time of receiving the third input as the hit location position at which movement of the cursor is stopped; and said position determining mechanism also determines, when the second input is received by the input receiving mechanism from the second control switch, a position of the cursor at the time of receiving the second input to be used in setting a shot power, and then automatically determines a subsequent predetermined position on the gauge as the hit location position at which movement of the cursor is stopped, wherein different sequences of control switch activation patterns are recognized by the game machine computer to enable a player manipulating the controller device to dynamically select between a plurality of different golf club shot modes during each golf ball shot operation.

17. The storage medium according to claim 16, wherein the position determining mechanism determines the hit location position so as to be randomly positioned every time the second input to the second control switch is received by the input receiving mechanism.

18. The storage medium according to claim 17, wherein:
the golf game program further allows the computer to function as a range setting mechanism which sets a range on the gauge and displays a change in a width of the range in response to at least one parameter selected from a group of parameters representing the ball, a golf club selected by a player, or characteristics of the game character; and the position determining mechanism determines the hit location position so as to be randomly positioned within the range set by the range setting mechanism.

19. The storage medium according to claim 18, wherein the golf game program further allows the computer to function as an area display mechanism which displays on the display device a random area and a meet area, along the gauge, the random area indicating the range set by the range setting mechanism, and the meet area serving as an index for determining the hit location position.

20. The storage medium according to claim 17, wherein the position determining mechanism randomly determines the hit location position according to a random number.

21. The storage medium according to claim 16, wherein the golf game program further allows the computer to function as a control-switch image display mechanism which displays on the display device a first image and a second image after the first input is received by the start cursor moving mechanism, the first image representing the first control switch, the second image representing the second control switch.

22. The storage medium according to claim 16, wherein the golf game program further allows the computer to function as:

an input processing mechanism which also receives a third input from the controller as an input produced by the first control switch or said second control switch or a third control switch or a fourth control switch among the plurality of control switches of the controller device;

a spin direction mechanism which sets a spin direction of the ball in response to the third input from the controller provided from either said first control switch or said second control switch or a third control switch or a fourth control switch, wherein the spins direction of the ball is set to a first direction when the third input is provided by one of said first through fourth control switches and is set to a second direction when the third input is provided by a different one of said first through fourth control switches; and wherein the scene in which the player character hits the ball displays a ball which travels according to a shot power, the hit location, and the spin direction.

23. The storage medium according to claim 22, wherein:
the golf game program further allows the computer to function as a spin strength mechanism which sets a spin strength of the ball in response to a fourth input from the controller provided after the third input by either said first control switch or said second control switch or said third control switch or said fourth control switch, wherein the spin strength of the first direction of the ball is set depending upon whether or not the third input and the fourth input are received from a same control switch.

24. The storage medium according to claim 23, wherein the golf game program further allows the computer to function as a history image display mechanism which displays on the display device, when the second input from the first control switch is received by the input receiving mechanism, a history image showing a history of inputs as sequentially received from the control switches.

25. A storage medium having stored thereon a golf game program to be executed by a computer of a game machine, the storage medium being readable by the computer, the game machine comprising a controller device having a plurality of control switches for permitting a user to sequentially provide a first input, a second input and a third input, and the game machine further comprising a display device on which is displayed a gauge and a cursor that moves on the gauge along with a scene in which a ball hit by a golf club swung by a game character travels in a game field according to a shot power and a hit location indicated by the cursor on the gauge, said golf game program configuring the game machine computer to function as:

a start cursor movement mechanism which receives said first input from the controller and initiates cursor movement along the gauge in response to said first input;

an input receiving mechanism which receives said second input to the controller; and a moving cursor position determining mechanism which determines, as a first detected cursor position, a position of the cursor at a time of receiving said second input from the input receiving mechanism and then determines, as a second detected cursor position, a predetermined position on the gauge at which movement of the cursor is stopped, wherein movement of the cursor along the gauge is initiated by the first input from the controller, the shot power is set in relation to the first detected position of the moving cursor at a time the second input is provided from, the controller, and the hit location is set in relation to a positron of the cursor at which movement of the cursor is stopped.

26. The storage medium according to claim 25, wherein:
the golf game program further allows the computer to function as a range setting mechanism which sets a range on the gauge and changes a width of the range in response to at least one or more conditions comprising circumstances of the ball, a golf club selected by a user, and characteristics of the game character; and the moving cursor position determining mechanism determines the second detected cursor position so as to be randomly positioned within the range set by the range setting mechanism.

27. The storage medium according to claim 26, wherein the golf game program further allows the computer to function as an area display mechanism which displays along the gauge on the display device a random area indicator and a meet area indicator, the random area indicator indicating the range set by the range setting mechanism, and the meet area indicator serving as an index for determining me second detected cursor position.

28. The storage medium according to claim 25, wherein the moving cursor position determining mechanism randomly determines the second detected cursor position according to a random number.

29. A storage medium having stored thereon a golf game program to be executed by a computer of a game machine, the storage medium being readable by the computer, the game machine comprising a controller device having a plurality of control switches and a display device on which is displayed a gauge and a cursor moving on the gauge along with a scene in which a ball hit by a golf club swung by a game character travels in a game field according to a shot power and a hit location indicated by the cursor on the gauge, and wherein different shot made operation selection inputs are preformed by a user during a club swing operation, said golf game program configuring the computer to function as:
- a start cursor movement mechanism which receives a first input from the controller and starts the cursor moving along the gauge in response to the first input;
- a cursor position determining mechanism which receives a second input to the controller and determines a position on the gauge of a cursor at a time of receiving the second input for use in setting a shot power parameter; and
- said cursor position determining mechanism also receives, after the first and second inputs from the control switches occur in a first predetermined sequence, a third input from the controller, and determines a position of the cursor on the gauge at the time of receiving the third input as a hit location position at which movement of the cursor along the gauge is stopped; and
- said cursor position determining mechanism also automatically determines a subsequent random position on the gauge as the hit location position when the first and second inputs occur in a second predetermined sequence which is different from said first predetermined sequence,
- wherein different control switch activation input patterns are recognized by the game machine computer to enable a user manipulating the controller device to dynamically select between a plurality of different shot operation modes during each club swing operation.

30. A method for operating a game machine, the game machine comprising a controller device having a plurality of control switches for generating inputs to the game machine and a display device on which is displayed a gauge and a cursor moving on the gauge, along with a scene in which an object moves in a game field according to at least two movement parameters of the object, the game machine having a dynamic operation mode selection arrangement wherein selection of one a plurality of different available operation modes for controlling movement of the object is performed by a user during a predetermined game operation, said method comprising:
- receiving a first input from the controller from a first control switch and initiating movement of the cursor displayed on the gauge in response to the first input;
- receiving a second input from the controller from either the first control switch or from a second control switch; and
- determining, as a cursor first detected position used for setting a first movement parameter for controlling the object, a first position of a moving cursor at a time of receiving the second input from the controller when said second input is produced from said first control switch, and then determining a subsequent a position of the same moving cursor at a time of receiving a third input from the controller from either the first control switch or the second control switch for use in setting a second movement parameter for controlling the object; and
- also determining, as a cursor first detected position used for setting a first movement parameter for controlling the object, a position of a moving cursor at a time of receiving said second input when said second input is produced from said second control switch, and then automatically selecting a different subsequent position of the moving cursor on the gauge for use in setting a second movement parameter for controlling the object,
- wherein different first and second control switch activation input patterns performed by a user during a course of a predetermined game operation are thereby recognized by the game machine to enable the user to dynamically select between a plurality of different available operation modes for controlling movement of the object.

31. The golf game machine according to claim 10, further comprising ball movement direction calculation mechanism which calculates a movement direction of the ball in the game field in accordance with the shot power and the hit location.

32. The golf game machine according to claim 31, further comprising a tentative hit-location setting mechanism which receives, prior to initiating movement of the cursor, an input indicative of a user's desired tentative hit location on a game character's golf ball, which is displayed as a circular shaped image having movable indicia within provided to a user for setting a tentative hit location, wherein
- the ball movement calculation mechanism determines a final hit location by adjusting a user-set tentative hit location in accordance with the second detected cursor position and determines a movement direction of the ball in accordance with the final hit location and the shot power.

33. The golf game machine according to claim 32, wherein the ball movement calculation mechanism determines the final hit location by adjusting the user-set tentative hit location in accordance with a deviation between a meet point displayed on the gauge and the second detected cursor position.

34. The storage medium according to claim 25, wherein the golf game program further enables the computer to function as a ball movement direction computation mechanism that computes a moving direction of the ball in the game field in accordance with the shot power and the hit location.

35. The storage medium according to claim 34, wherein:
- the golf game program further enables the computer to function as a tentative hit-location setting mechanism which receives, prior to initiating movement of the cursor, an input indicative of a user's desired tentative hit location on a game character's golf ball, which is displayed as a circular shaped image and which is provided to a user for setting a tentative hit location; and
- wherein the ball movement computation mechanism determines a final hit location by adjusting the user-set tentative hit location in accordance with the second detected cursor position and computes a movement direction of the ball in accordance with the final hit location and the shot power.

36. The storage medium according to claim 35, wherein the ball movement computation mechanism determines the final hit location by adjusting the user-set tentative hit location in accordance with a deviation between a meet point displayed on the gauge and the second detected cursor position.

* * * * *